(12) United States Patent
Slobodyanyuk et al.

(10) Patent No.: US 12,103,540 B2
(45) Date of Patent: Oct. 1, 2024

(54) OCCUPANCY MAPPING FOR AUTONOMOUS CONTROL OF A VEHICLE

(71) Applicant: QUALCOMM Incorporated, San Diego, CA (US)

(72) Inventors: Volodimir Slobodyanyuk, San Diego, CA (US); Avdhut Joshi, Carlsbad, CA (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 17/443,974

(22) Filed: Jul. 29, 2021

(65) Prior Publication Data

US 2023/0036838 A1    Feb. 2, 2023

(51) Int. Cl.
*B60W 40/08*    (2012.01)
*B60W 60/00*    (2020.01)

(52) U.S. Cl.
CPC .......... *B60W 40/08* (2013.01); *B60W 60/001* (2020.02); *B60W 2540/01* (2020.02)

(58) Field of Classification Search
CPC . B60W 40/08; B60W 60/001; B60W 2540/01
See application file for complete search history.

(56) References Cited

U.S. PATENT DOCUMENTS

| | | | | |
|---|---|---|---|---|
| 2018/0059231 A1* | 3/2018 | Dewberry | ............. | G01S 13/878 |
| 2019/0138823 A1* | 5/2019 | Doria | .................. | G06V 20/588 |
| 2020/0018825 A1* | 1/2020 | Dia | ........................ | G01S 17/931 |
| 2020/0103523 A1 | 4/2020 | Liu et al. | | |
| 2021/0020045 A1 | 1/2021 | Huang et al. | | |
| 2021/0056712 A1* | 2/2021 | Daudelin | ................ | G06V 20/58 |
| 2021/0101624 A1* | 4/2021 | Philbin | ................ | G06V 10/803 |
| 2022/0196829 A1* | 6/2022 | Chen | ..................... | G01S 13/876 |
| 2022/0197301 A1* | 6/2022 | Moawad | ............... | G01S 7/2955 |
| 2022/0244351 A1* | 8/2022 | Bybee | ..................... | G01S 13/89 |
| 2023/0058999 A1* | 2/2023 | Kwon | .................... | G05D 1/249 |

FOREIGN PATENT DOCUMENTS

| | | |
|---|---|---|
| DE | 102007013023 A1 | 9/2008 |
| DE | 102016001772 A1 * | 8/2016 |
| EP | 2963446 A1 | 1/2016 |

(Continued)

OTHER PUBLICATIONS

Machine translation of DE 102016001772 A1 (Year: 2016).*

(Continued)

*Primary Examiner* — Hussein Elchanti
*Assistant Examiner* — Kenneth M Dunne
(74) *Attorney, Agent, or Firm* — QUALCOMM Incorporated

(57) ABSTRACT

In some aspects, a device may receive point data associated with a cell of an occupancy grid for controlling a vehicle. The device may determine, based on the point data, a characteristic of the cell that is associated with an occupancy probability of the cell, wherein the occupancy probability is determined according to a first technique based on the point data. The device may configure, based on the characteristic, the occupancy probability for the cell, within the occupancy grid, according to a second technique. Numerous other aspects are described.

30 Claims, 9 Drawing Sheets

(56) References Cited

FOREIGN PATENT DOCUMENTS

| WO | 2018091386 A1 | 5/2018 |
|---|---|---|
| WO | 2020118545 A1 | 6/2020 |
| WO | 2020250020 A1 | 12/2020 |

OTHER PUBLICATIONS

Li M., et al., "High Resolution Radar-based Occupancy Grid Mapping and Free Space Detection," Proceedings of the 4th International Conference on Vehicle Technology and Intelligent Transport Systems (VEHITS 2018), Mar. 2018, pp. 70-81.
International Search Report and Written Opinion—PCT/US2022/072547—ISA/EPO—Sep. 16, 2022.
Porebski J., et al., "Performance Evaluation of the Highway Radar Occupancy Grid", Sensors, vol. 21, No. 6, Mar. 20, 2021, 22 Pages, XP055859570, p. 2177, DOI: 10.3390/s21062177, pp. 3-5.
Schutz M., et al., "Multiple Extended Objects Tracking with Object-Local Occupancy Grid Maps", 17th International Conference on Information Fusion (Fusion), International Society of Information Fusion, Jul. 7, 2014, pp. 1-7, XP032653887, pp. 2-5.

* cited by examiner

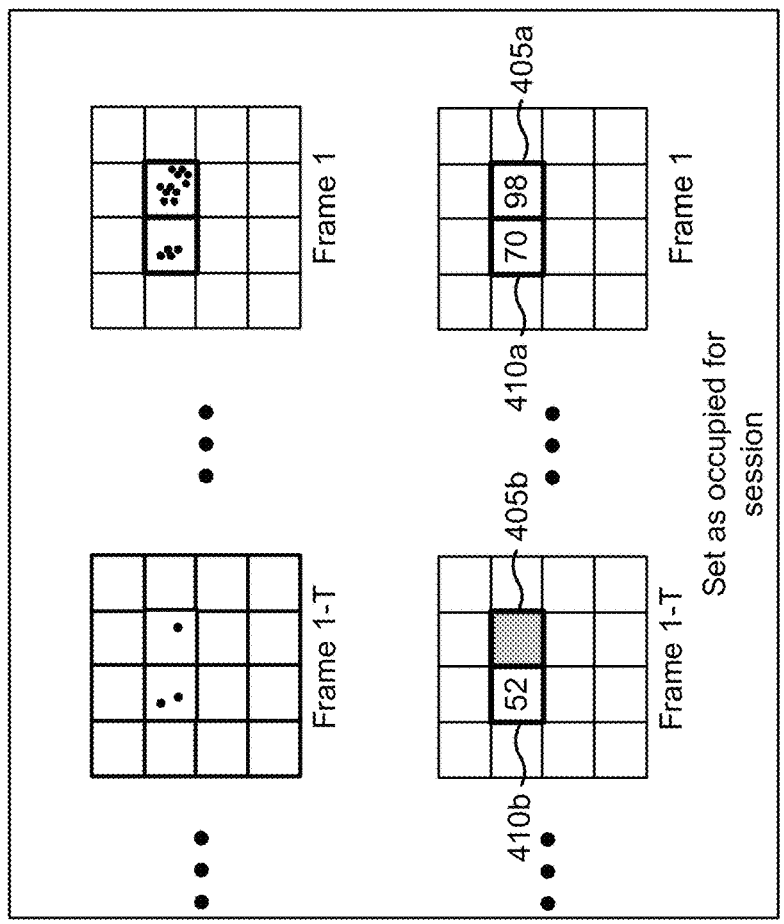
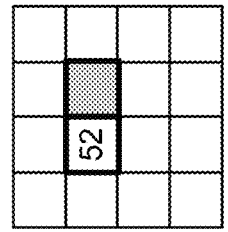
FIG. 4

OCCUPANCY MAPPING FOR AUTONOMOUS CONTROL OF A VEHICLE

FIELD OF THE DISCLOSURE

Aspects of the present disclosure generally relate to occupancy mapping and, for example, to occupancy mapping for autonomous control of a vehicle.

BACKGROUND

Occupancy mapping may be used in road scene understanding for autonomous driving. Occupancy mapping may encapsulate information of the drivable area and road obstacles of an environment being traveled by an autonomous vehicle.

SUMMARY

Some aspects described herein relate to a method. The method may include receiving, by a device and from a scanner, first point data associated with a first frame of an occupancy grid. The method may include determining, by the device and based on the first point data, an occupancy probability of a first cell of the occupancy grid that is associated with the first point data and indicates that the first cell of the occupancy grid is occupied. The method may include receiving, by the device and from the scanner, second point data associated with a second frame of the occupancy grid. The method may include determining, by the device and based on the second point data, an occupancy probability of a second cell of the occupancy grid that is associated with the second point data and indicates that the second cell of the occupancy grid is occupied. The method may include determining, by the device and based on a grid location of the first cell and the second cell within the occupancy grid, that the second cell is between the first cell and a grid location of the scanner within the occupancy grid. The method may include reducing, by the device, the occupancy probability of other cells of the occupancy grid, the other cells being different from the second cell, while preventing the occupancy probability of the first cell from being reduced for at least the duration of the second frame.

Some aspects described herein relate to a device. The device may include a memory and one or more processors coupled to the memory. The one or more processors may be configured to receive, from a scanner, first point data associated with a first frame of an occupancy grid. The one or more processors may be configured to determine, based on the first point data, an occupancy probability of a first cell of the occupancy grid that is associated with the first point data and indicates that the first cell of the occupancy grid is occupied. The one or more processors may be configured to receive, from the scanner, second point data associated with a second frame of the occupancy grid. The one or more processors may be configured to determine, based on the second point data, an occupancy probability of a second cell of the occupancy grid that is associated with the second point data and indicates that the second cell of the occupancy grid is occupied. The one or more processors may be configured to determine, based on a grid location of the first cell and the second cell within the occupancy grid, that the second cell is between the first cell and a grid location of the scanner within the occupancy grid. The one or more processors may be configured to reduce the occupancy probability of other cells of the occupancy grid, the other cells being different from the second cell, while preventing the occupancy probability of the first cell from being reduced for at least the duration of the second frame.

Some aspects described herein relate to a non-transitory computer-readable medium that stores a set of instructions. The set of instructions, when executed by one or more processors of the device, may cause the device to receive, from a scanner, first point data associated with a first frame of an occupancy grid. The set of instructions, when executed by one or more processors of the device, may cause the device to determine, based on the first point data, an occupancy probability of a first cell of the occupancy grid that is associated with the first point data and indicates that the first cell of the occupancy grid is occupied. The set of instructions, when executed by one or more processors of the device, may cause the device to receive, from the scanner, second point data associated with a second frame of the occupancy grid. The set of instructions, when executed by one or more processors of the device, may cause the device to determine, based on the second point data, an occupancy probability of a second cell of the occupancy grid that is associated with the second point data and indicates that the second cell of the occupancy grid is occupied. The set of instructions, when executed by one or more processors of the device, may cause the device to determine, based on a grid location of the first cell and the second cell within the occupancy grid, that the second cell is between the first cell and a grid location of the scanner within the occupancy grid. The set of instructions, when executed by one or more processors of the device, may cause the device to reduce the occupancy probability of other cells of the occupancy grid, the other cells being different from the second cell, while preventing the occupancy probability of the first cell from being reduced for at least the duration of the second frame.

Some aspects described herein relate to an apparatus. The apparatus may include means for receiving, from a scanner, first point data associated with a first frame of an occupancy grid. The apparatus may include means for determining, based on the first point data, an occupancy probability of a first cell of the occupancy grid that is associated with the first point data and indicates that the first cell of the occupancy grid is occupied. The apparatus may include means for receiving, from the scanner, second point data associated with a second frame of the occupancy grid. The apparatus may include means for determining, based on the second point data, an occupancy probability of a second cell of the occupancy grid that is associated with the second point data and indicates that the second cell of the occupancy grid is occupied. The apparatus may include means for determining, based on a grid location of the first cell and the second cell within the occupancy grid, that the second cell is between the first cell and a grid location of the scanner within the occupancy grid. The apparatus may include means for reducing the occupancy probability of other cells of the occupancy grid, the other cells being different from the second cell, while preventing the occupancy probability of the first cell from being reduced for at least the duration of the second frame.

Some aspects described herein relate to a method. The method may include receiving, by a device and from a scanner, first point data associated with a first frame of an occupancy grid. The method may include determining, by the device and based on the first point data, an occupancy status of a first cell of the occupancy grid that is associated with the first point data. The method may include receiving, by the device and from the scanner, second point data associated with a second frame of the occupancy grid. The method may include determining, by the device and based on the second point data, that a second cell of the occupancy grid is occupied and that the second cell is between the first cell and a grid location of the scanner within the occupancy grid. The method may include preventing, by the device, the occupancy status of the first cell from being modified based on the second frame.

Some aspects described herein relate to a device. The device may include a memory and one or more processors coupled to the memory. The one or more processors may be configured to receive, from a scanner, first point data associated with a first frame of an occupancy grid. The one or more processors may be configured to determine, based on the first point data, an occupancy status of a first cell of the occupancy grid that is associated with the first point data. The one or more processors may be configured to receive, from the scanner, second point data associated with a second frame of the occupancy grid. The one or more processors may be configured to determine, based on the second point data, that a second cell of the occupancy grid is occupied and that the second cell is between the first cell and a grid location of the scanner within the occupancy grid. The one or more processors may be configured to prevent the occupancy status of the first cell from being modified based on the second frame.

Some aspects described herein relate to a non-transitory computer-readable medium that stores a set of instructions. The set of instructions, when executed by one or more processors of the device, may cause the device to receive, from a scanner, first point data associated with a first frame of an occupancy grid. The set of instructions, when executed by one or more processors of the device, may cause the device to determine, based on the first point data, an occupancy status of a first cell of the occupancy grid that is associated with the first point data. The set of instructions, when executed by one or more processors of the device, may cause the device to receive, from the scanner, second point data associated with a second frame of the occupancy grid. The set of instructions, when executed by one or more processors of the device, may cause the device to determine, based on the second point data, that a second cell of the occupancy grid is occupied and that the second cell is between the first cell and a grid location of the scanner within the occupancy grid. The set of instructions, when executed by one or more processors of the device, may cause the device to prevent the occupancy status of the first cell from being modified based on the second frame.

Some aspects described herein relate to an apparatus. The apparatus may include means for receiving, from a scanner, first point data associated with a first frame of an occupancy grid. The apparatus may include means for determining, based on the first point data, an occupancy status of a first cell of the occupancy grid that is associated with the first point data. The apparatus may include means for receiving, from the scanner, second point data associated with a second frame of the occupancy grid. The apparatus may include means for determining, based on the second point data, that a second cell of the occupancy grid is occupied and that the second cell is between the first cell and a grid location of the scanner within the occupancy grid. The apparatus may include means for preventing the occupancy status of the first cell from being modified based on the second frame.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-5 are diagrams illustrating examples associated with occupancy mapping for autonomous control of a vehicle, in accordance with the present disclosure.

DETAILED DESCRIPTION

Figure 1:
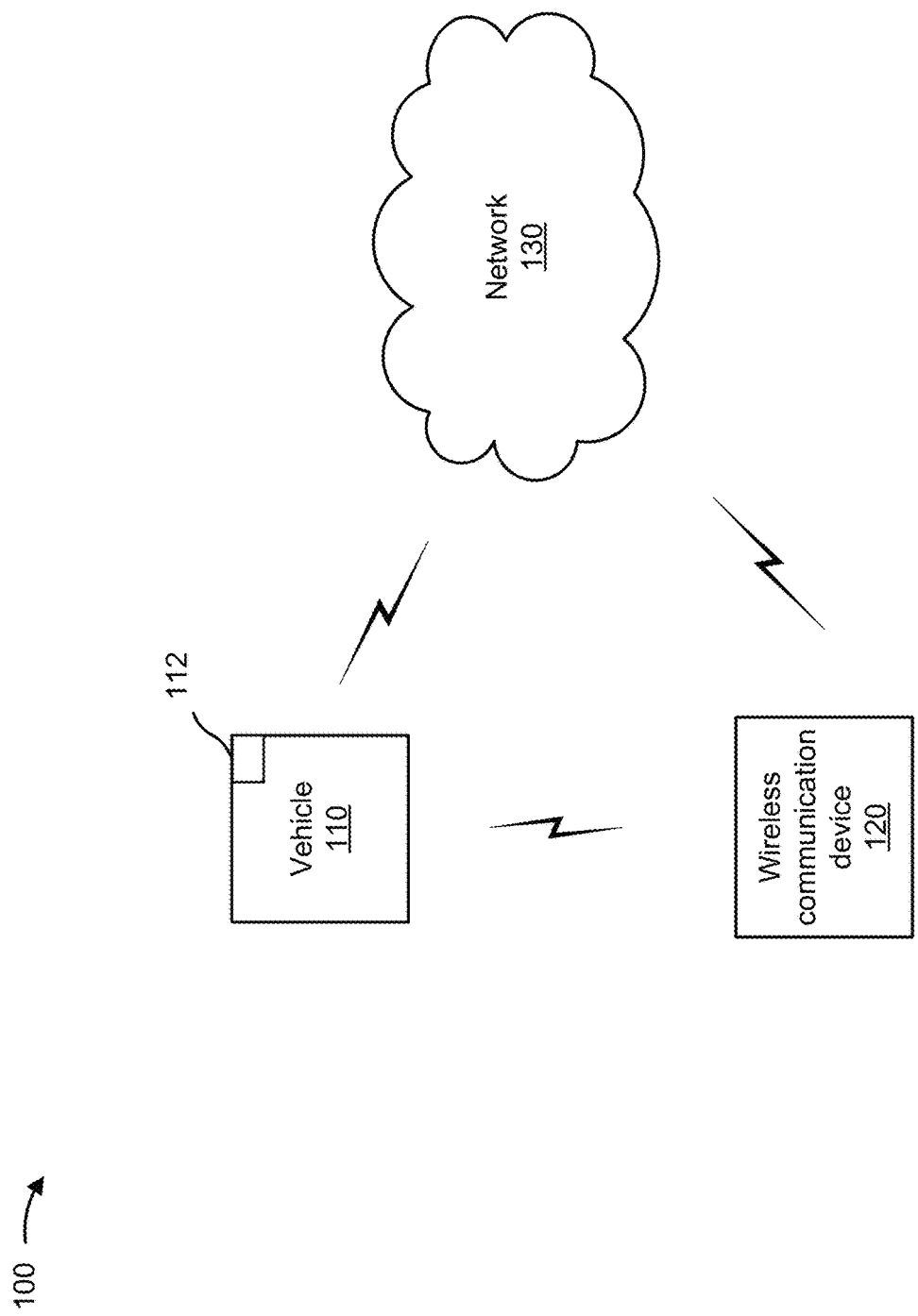
FIG. 1 is a diagram illustrating an example environment in which occupancy mapping for autonomous control of a vehicle described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A vehicle may include a system (e.g., an electronic control unit (ECU), an autonomous driving system, and/or the like) configured to control an operation of the vehicle. The system may use data obtained by one or more sensors of the vehicle to perform occupancy mapping to determine an occupancy status (e.g., unoccupied space, occupied space, drivable space, and/or the like) of the environment surrounding the vehicle. For example, the system may use data obtained by a global navigation satellite system (GNSS)/inertial measurement unit (IMU), a camera, a light detection and ranging (LIDAR) scanner, and/or the like to determine an occupancy status of the environment surrounding the vehicle. The system may detect drivable space that the vehicle can occupy based on the occupancy status of the environment surrounding the vehicle. However, the system may not account for various limitations of the one or more sensors, which may negatively impact the system's ability to detect the drivable space.

For example, the GNSS/IMU may provide data indicating a position of the vehicle in the environment. The system may couple the data obtained by the GNSS/IMU with a high resolution map to determine an exact location of the vehicle on the map, and may use the map to estimate the occupancy status of the environment surrounding the vehicle and/or to estimate drivable space within the environment. However, the map may not include information associated with recent changes to the environment. For example, the map may not include information associated with construction being performed on a roadway, other vehicles traveling along the roadway, and/or objects, people, animals, and/or the like located on or adjacent to the roadway, among other examples.

The camera may obtain images of the environment surrounding the vehicle. The system may perform object detection to identify objects within the images and may determine an occupancy status of the environment surrounding the vehicle based at least in part on detecting the objects within the images. However, the camera may be a two-dimensional sensor that is not capable, by itself, of measuring a distance at which an object is located from the vehicle. Instead, the system and/or the camera may use one or more algorithms to estimate the distance at which an object depicted in an image is located from the vehicle. Because the distance is estimated, rather than measured, estimation of the velocity of an object may be prone to error and noise. Further, the camera may be sensitive to the environment in which the camera is operating and environmental conditions such as rain, fog, snow, and/or the like may impact the quality of the images captured by the camera.

The LIDAR scanner may use light in the form of a pulsed laser to obtain point data as the LIDAR scanner is rotated. The point data may correspond to a reflection of the light off of an object and may be used to perform three-dimensional (3D) object detection and to determine a velocity of the object. However, radiation safety requirements may limit an amount of energy that the LIDAR scanner transmits. The limits on the amount of energy that the LIDAR scanner is able to transmit may cause the LIDAR scanner to use a scanning regime (e.g., rotation of a laser head, rotation of a galvanic mirror, and/or the like) that focuses all of the energy transmitted by the LIDAR scanner in a limited number of directions. The use of the scanning regime may cause the velocity measurements to be prone to errors resulting from a smearing (e.g., due to scanning) of the LIDAR signal across various segments of an object. Further, the LIDAR scanner may be sensitive to the environment in which the LIDAR scanner is operating and environmental conditions such as rain, fog, snow, and/or the like may impact the quality of the point data obtained by the LIDAR scanner.

Some implementations described herein enable a device (e.g., an autonomous driving system and/or an electronic control unit) associated with a vehicle to account for limitations of one or more sensors and accurately detect drivable space in an environment surrounding the vehicle. The device may learn grid locations of stationary objects in spite of the objects lying in the shadow of another object due to temporary effects. When learning the shadowed grid locations, this improves the accuracy of the detection of the drivable space. For example, the device may receive, from a scanner, first point data associated with a first frame of an occupancy grid for controlling the driving of a vehicle. The device may determine, based on the first point data, an occupancy probability of a first cell of the occupancy grid that is associated with the first point data. The device may receive, from the scanner, second point data associated with a second frame of the occupancy grid. The device may determine, based on the second point data, that a second cell of the occupancy grid is occupied and that the second cell is between the first cell and a grid location of the scanner within the occupancy grid. The device may determine that the first cell is in the shadow of an object associated with the second cell and/or that the shadow impacts the first point data associated with the first cell. The device may configure, based on whether the first cell is in the shadow of an object associated with the second cell and/or that the shadow impacts the first point data, the occupancy probability for the first cell within the occupancy grid. The device may determine a drivable space for the vehicle based on the occupancy grid and may control the vehicle based on the drivable space. In this way, the device may account for limitations of one or more sensors, thereby enabling the device to accurately determine the drivable space for the vehicle.

In some aspects, the device may reduce latency associated with the detection operation. The detection operation has an inherent delay. This delay is the result of using a posteriori probabilities as occupancy probabilities. To reduce this delay, the device may prevent the occupancy probability of the first cell from being reduced based on the second point data (e.g., based on the first cell being within the shadow of an object associated with the second cell). By preventing the reduction of the occupancy probability of the first cell, the device may preserve the detection proverbiality, and the detection is more speedy once the shadowing terminates.

FIG. 1 is a diagram of an example environment 100 in which systems and/or methods described herein may be implemented. As shown in FIG. 1, environment 100 may include a vehicle 110 with a corresponding electronic control unit (ECU) 112, a wireless communication device 120, and a network 130. Although vehicle 110 is shown in FIG. 1 with a single corresponding ECU 112 (e.g., the ECU 112 is collocated with the vehicle 110), the vehicle 110 in environment 100 may include two or more ECUs 112. Devices of environment 100 may interconnect via wired connections, wireless connections, or a combination of wired and wireless connections.

The vehicle 110 may include any vehicle that is capable of transmitting and/or receiving data associated with object detection for a rotational sensor, as described herein. For example, the vehicle 110 may be a consumer vehicle, an industrial vehicle, a commercial vehicle, and/or the like. The vehicle 110 may be capable of traveling and/or providing transportation via public roadways, may be capable of use in operations associated with a worksite (e.g., a construction site), and/or the like. The vehicle 110 may include a sensor system that includes one or more sensors that are used to generate and/or provide vehicle data associated with vehicle 110 and/or a LIDAR scanner that is used to obtain point data used for 3D object detection.

The vehicle 110 may be controlled by the ECU 112, which may include one or more devices capable of receiving, generating, storing, processing, and/or providing information associated with object detection for a rotational sensor described herein. For example, the ECU 112 may include and/or be a component of a communication and/or computing device, such as, an onboard computer, a control console, an operator station, or a similar type of device. The ECU 112 may be configured to communicate with other ECUs and/or other devices. For example, advances in communication technologies have enabled vehicle-to-everything (V2X) communication, which may include vehicle-to-vehicle (V2V) communication, vehicle-to-pedestrian (V2P) communication, and/or the like. In some aspects, the ECU 112 may include and/or be used to provide V2X communication, vehicle data associated with the vehicle 110 (e.g., identification information, sensor data, and/or the like), as described herein.

The wireless communication device 120 includes one or more devices capable of receiving, generating, storing, processing, and/or providing information associated with object detection for a rotational sensor, as described elsewhere herein. For example, the wireless communication device 120 may include a base station, an access point, and/or the like. Additionally, or alternatively, the wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

The network 130 includes one or more wired and/or wireless networks. For example, the network 130 may include a peer-to-peer (P2P) network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, the network 130 may include and/or be a P2P communication link that is directly between one or more of the devices of environment 100.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
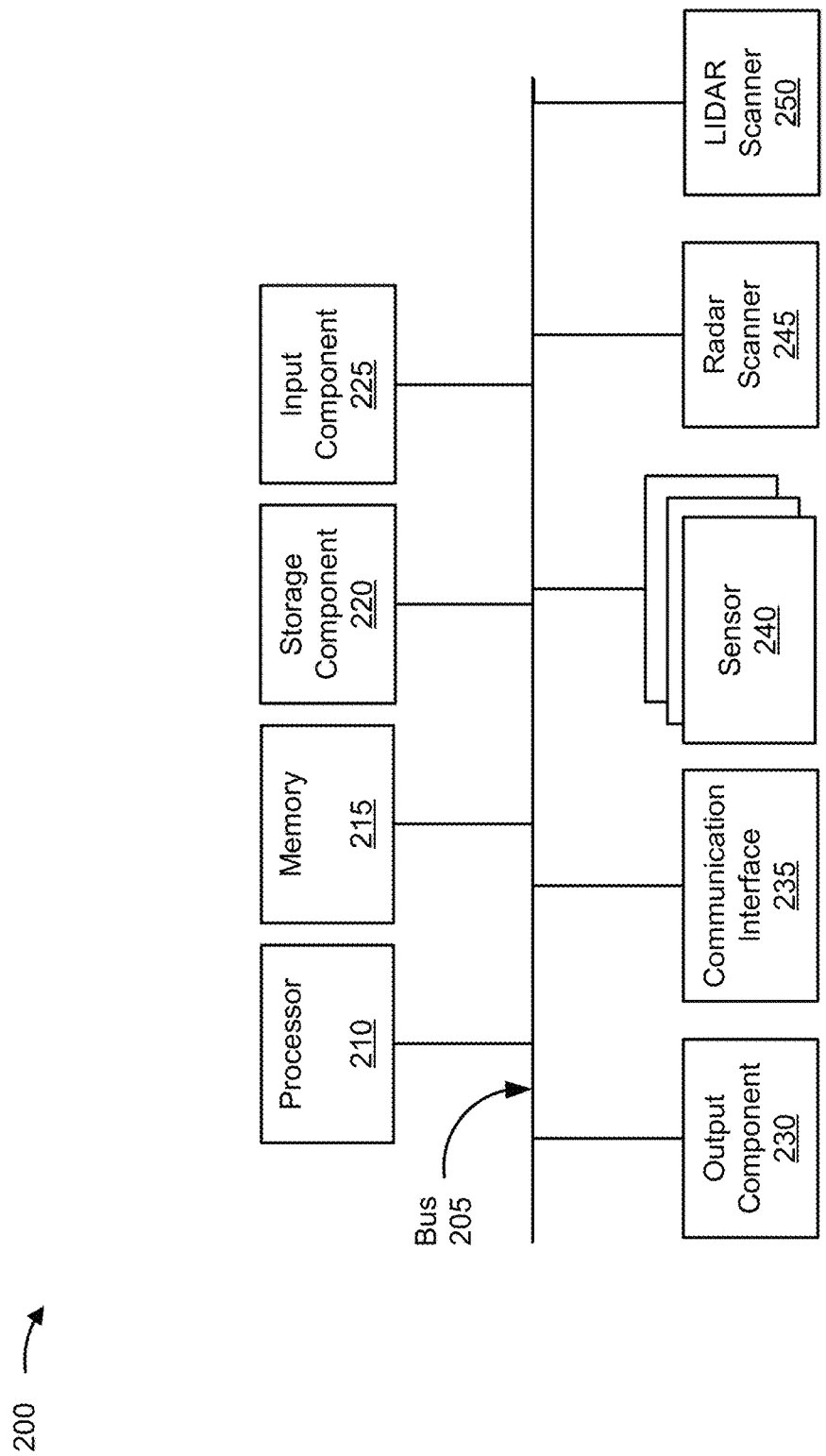
FIG. 2 is a diagram illustrating example components of one or more devices shown in FIG. 1, such as an electronic control unit of a vehicle and/or a wireless communication device, in accordance with the present disclosure.

FIG. 2 is a diagram illustrating example components of a device 200, in accordance with the present disclosure. The device 200 may correspond to the vehicle 110, the ECU 112, and/or the wireless communication device 120. In some aspects, the vehicle 110, the ECU 112, and/or the wireless communication device 120 may include one or more devices 200 and/or one or more components of the device 200. As shown in FIG. 2, device 200 may include a bus 205, a processor 210, a memory 215, a storage component 220, an input component 225, an output component 230, a communication interface 235, a sensor 240, a radar scanner 245, a LIDAR scanner 250, and/or the like.

The bus 205 includes a component that permits communication among the components of device 200. The processor 210 is implemented in hardware, firmware, software, or a combination of hardware, firmware, and software. The processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, the processor 210 includes one or more processors capable of being programmed to perform a function. The memory 215 includes a random access memory (RAM), a read only memory (ROM), and/or another type of dynamic or static storage device (e.g., a flash memory, a magnetic memory, and/or an optical memory) that stores information and/or instructions for use by the processor 210.

The storage component 220 stores information and/or software related to the operation and use of device 200. For example, the storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 225 includes a component that permits device 200 to receive information, such as via user input (e.g., a touch screen display, a keyboard, a keypad, a mouse, a button, a switch, and/or a microphone). Additionally, or alternatively, the input component 225 may include a component for determining a position or a location of the device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). The output component 230 includes a component that provides output information from the device 200 (e.g., a display, a speaker, a haptic feedback component, an audio or visual indicator, and/or the like).

The communication interface 235 includes a transceiver-like component (e.g., a transceiver and/or a separate receiver and transmitter) that enables the device 200 to communicate with other devices, such as via a wired connection, a wireless connection, or a combination of wired and wireless connections. The communication interface 235 may permit the device 200 to receive information from another device and/or provide information to another device. For example, the communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

The sensor 240 includes one or more devices capable of sensing characteristics associated with device the 200. The sensor 240 may include one or more integrated circuits (e.g., on a packaged silicon die) and/or one or more passive components of one or more flex circuits to enable communication with one or more components of the device 200.

The sensor 240 may include an optical sensor that has a field of view in which the sensor 240 may determine one or more characteristics of an environment of the device 200. In some aspects, the sensor 240 may include a camera. For example, the sensor 240 may include a low-resolution camera (e.g., a video graphics array (VGA)) that is capable of capturing images that are less than one megapixel, images that are less than 1216×912 pixels, and/or the like. The sensor 240 may be a low-power device (e.g., a device that consumes less than ten milliwatts (mW) of power) that has always-on capability while the device 200 is powered on.

Additionally, or alternatively, the sensor 240 may include magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e.g, that uses triangulation, multilateration, and/or the like), and/or the like), a gyroscope (e.g., a micro-electro-mechanical systems (MEEMS) gyroscope or a similar type of device), an accelerometer, a speed sensor, a motion sensor, an infrared sensor, a temperature sensor, a pressure sensor, and/or the like.

The radar scanner 245 may include one or more devices that use radio waves to determine the range, angle, and/or velocity of an object based on radar data obtained by the radar scanner 245. The radar scanner 245 may provide the radar data to the ECU 112 to enable the ECU 112 to perform occupancy mapping according to the radar data, as described herein.

The LIDAR scanner 250 may include one or more devices that use light in the form of a pulsed laser to measure distances of objects from the LIDAR scanner based on LIDAR data obtained by the LIDAR scanner 250. The LIDAR scanner 250 may provide the LIDAR data to the ECU 112 to enable the ECU 112 to perform occupancy mapping according to the radar data, as described herein.

The device 200 may perform one or more processes described herein. The device 200 may perform these processes based on the processor 210 executing software instructions stored by a non-transitory computer-readable medium, such as the memory 215 and/or the storage component 220. A computer-readable medium is defined herein as a non-transitory memory device. A memory device includes memory space within a single physical storage device or memory space spread across multiple physical storage devices.

Software instructions may be read into the memory 215 and/or the storage component 220 from another computer-readable medium or from another device via the communication interface 235. When executed, software instructions stored in the memory 215 and/or the storage component 220 may cause the processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, the device 200 includes means for performing one or more processes described herein and/or means for performing one or more operations of the processes described herein. For example, device 200 may include means for receiving point data associated with a cell of an occupancy grid for controlling a vehicle; means for determining, based on the point data, a characteristic of the cell that is associated with an occupancy probability of the cell, wherein the occupancy probability is determined according to a first technique based on the point data; and means for configuring, based on the characteristic, the occupancy probability for the cell, within the occupancy grid, according to a second technique; or the like. In some aspects, such means may include one or more components of the device 200 described in connection with FIG. 2, such as the bus 205, the processor 210, the memory 215, the storage component 220, the input component 225, the output component 230, the communication interface 235, the sensor 240, the radar scanner 245, and/or the LIDAR scanner 250.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
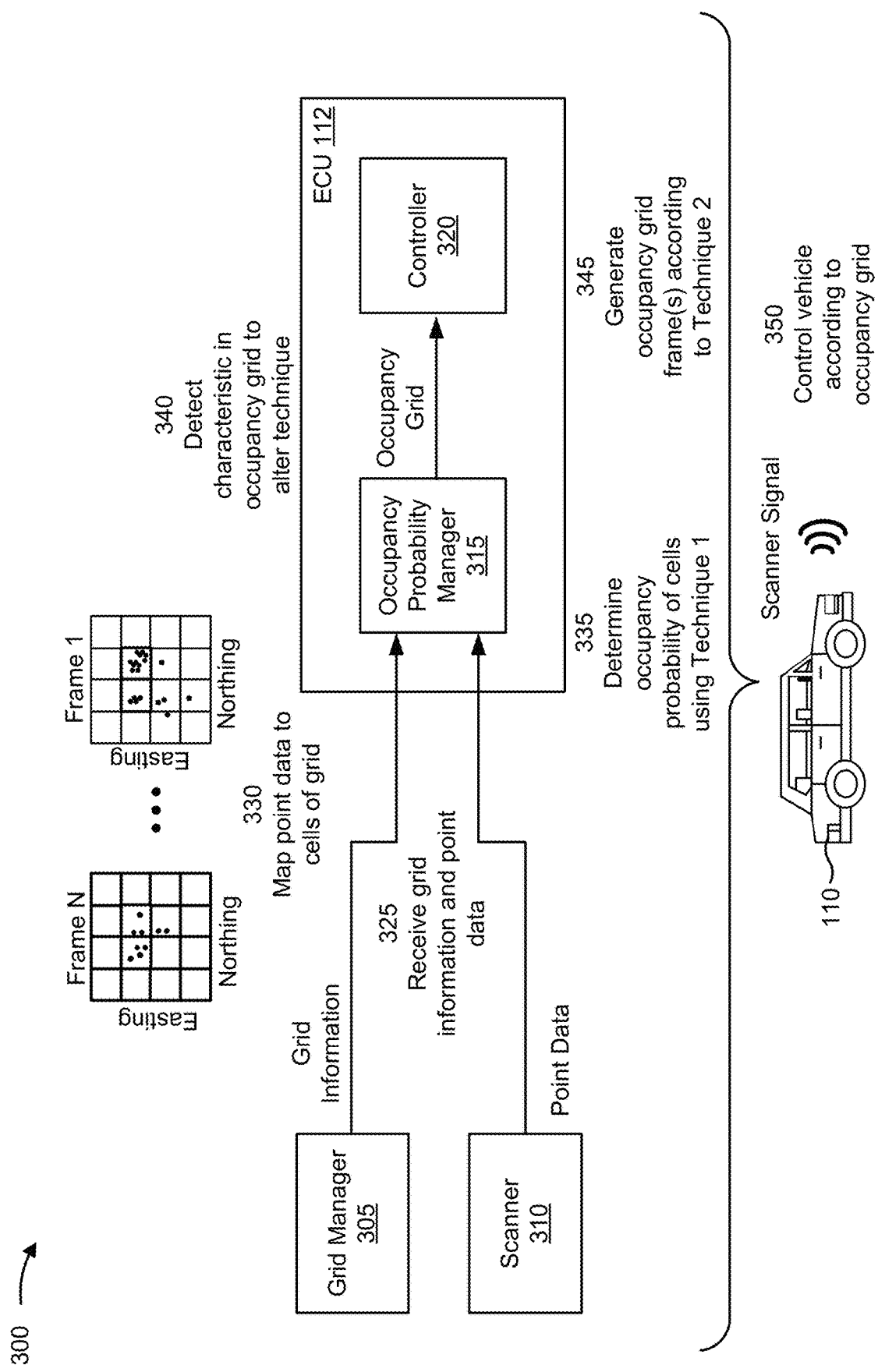

FIG. 3 is a diagram illustrating an example 300 associated with occupancy mapping for autonomous control of a vehicle, in accordance with the present disclosure. As shown in FIG. 3, a vehicle 110 is associated with a grid manager 305, a scanner 310 (e.g., radar scanner 245 and/or LIDAR scanner 250), and an ECU 112 that includes an occupancy probability manager 315 and a controller 320. The grid manager 305, the scanner 310, the occupancy probability manager 315, and the controller 320 are described in greater detail below.

As shown by reference number 325, the ECU 112 (e.g., the occupancy probability manager 315, as shown in FIG. 3) receives grid information and point data. In some aspects, the ECU 112 receives the grid information from the grid manager 305. For example, the grid manager 305 may provide the grid information to the ECU 112 based at least in part on a status of the vehicle 110 (e.g., the vehicle 110 being started, the vehicle 110 shifting into a particular gear (e.g., drive), and/or the like), a request from the ECU 112, and/or the like.

The grid information may include information associated with a static fixed coordinate system and a vehicle fixed coordinate system. The static fixed coordinate system may remain unchanged for a time period during which the vehicle 110 travels along a route (e.g., for a time period beginning at a time when the vehicle 110 travels from an initial location of the vehicle 110 and ending at a time when the vehicle 110 reaches a destination, an ignition of the vehicle 110 is moved to an off position, the vehicle 110 is shifted into park, and/or the like).

In some aspects, the static fixed coordinate system includes an origin corresponding to an initial location of the vehicle 110 on a map and each axis of the fixed coordinate system may extend in a respective direction that is perpendicular to a direction in which each other axis extends. For example, the static fixed coordinate system may be in an East-North-Up (ENU) format and a first axis may be aligned in an east-west direction (e.g., a coordinate of the first axis increases in value as the vehicle 110 travels east and decreases in value as the vehicle 110 travels west), a second axis may be aligned in a north-south direction (e.g., a coordinate of the second axis increases in value as the vehicle 110 travels north and decreases in value as the vehicle 110 travels south), and/or a third axis may be aligned in an up-down direction (e.g., a coordinate of the third axis increases in value as the vehicle 110 travels upward (e.g., up a ramp of a parking garage) and decreases in value as the vehicle 110 travels downward). Though here the ENU coordinate system is being referred to as an example, multiple other coordinate systems are applicable as well.

In some aspects, the static fixed coordinate system is divided into a grid of a plurality of cells corresponding to respective areas on the map. In some aspects, each cell, of the plurality of cells, is a same size as the other cells of the plurality of cells, while in some other aspects, each cell needs not to be of the same size. A size of the plurality of cells may be based at least in part on a rate at which the scanner 310 obtains frames of point data (e.g., a size of the plurality of cells may be inversely proportional to a rate at which the scanner 310 obtains frames of point data, a size of the plurality of cells may be proportional to a rate at which the scanner 310 obtains frames of point data, and/or the like), a type of area (e.g., rural, urban, and/or the like) associated with the environment surrounding the vehicle 110, and/or the like. The rate at which the scanner 310 obtains frame of point data may define a duration of the frames, for instance, a time interval between two subsequent frames. Based on its processing capabilities, the ECU 112 may operate a same rate or a fraction of the same rate (e.g. one half, one quarter, one eight of the same rate), thereby defining the time intervals (or durations) at which the ECU 112 performs its update cycles (e.g. (re-)determining occupancy probabilities).

In some aspects, the vehicle fixed coordinate system may have an origin that is located at a current location of the vehicle 110 (e.g., the location of the origin changes as the location of the vehicle 110 changes). Each axis of the vehicle fixed coordinate system may be aligned with a respective axis of the static fixed vehicle system. For example, the vehicle fixed coordinate system may be in an ENU format, and a first axis may be aligned with the first axis of the static fixed coordinate system in the east-west direction, a second axis may be aligned with the second axis of the static fixed coordinate system in the north-south direction, and/or a third axis may be aligned with the third axis of the static fixed coordinate system in the up-down direction The vehicle fixed coordinate system may be divided into a grid of a plurality of cells corresponding to respective areas on the map. In some aspects, as a preferable option yet not a requirement, a size of the plurality of cells of the vehicle fixed coordinate system is the same as the size of the plurality of cells of the static fixed coordinate system.

In some aspects, the boundaries of the plurality of cells of the vehicle fixed coordinate system are aligned with the boundaries of the plurality of cells of the static fixed system. In some aspects, as the vehicle 110 travels along a route, the vehicle fixed coordinate system is shifted by an integer quantity of cells to eliminate any offset between cell borders of cells of the static fixed coordinate system and cells of the vehicle fixed coordinate system.

The ECU 112 may receive the point data from the scanner 310. The scanner 310 may emit a pulse of energy (e.g., a radio wave, a light wave, and/or the like) in a first direction and may obtain a first frame of point data based at least in part on a reflection of the pulse of energy off of an object. The scanner 310 may emit a pulse of energy in a second direction and may obtain a second frame of point data. The scanner 310 may continue in a similar manner to obtain a series of frames of point data corresponding to one or more objects located in the environment surrounding the vehicle 110.

The scanner 310 may provide one or more of the frames of point data to the ECU 112. In some aspects, the scanner 310 provides a frame of point data to the ECU 112 based at least in part on obtaining the frame of point data. In some aspects, the scanner 310 provides a group of frames of point data to the ECU 112. In some aspects, the group of frames of point data includes each frame of point data obtained by the scanner 310 as the scanner 310 rotates 360 degrees (e.g., a complete point cloud of point data).

In some aspects, a frame of point data includes one or more instances of point data. Each instance of point data (referred to herein as a "point" or a "point of point data") included in a frame of point data may include one or more characteristics of an object associated with the point of point data. For example, a point of point data may include a set of coordinates (e.g., an x coordinate, a y coordinate, and/or a z coordinate in a Cartesian coordinate system) corresponding to a location of an object, a set of velocities (e.g., a velocity in a direction corresponding to a first axis of a coordinate system (e.g., $V_x$), a velocity in a direction corresponding to a second axis of a coordinate system (e.g., $V_y$), and/or a velocity in a direction corresponding to a third axis of a coordinate system (e.g., $V_z$)) associated with the object, an indication of a probability of existence associated with the object, an indication of a size of an object that is represented by set of points (e.g., a radar cross section associated with the object), and/or the like. Additionally, a number of auxiliary parameters may also be provided in the point data, for example, additional information about the dynamic properties of the point.

In some aspects, the set of coordinates included with a point of point data may be associated with a reference coordinate system associated with the scanner 310. For example, the set of coordinates may be associated with a reference coordinate system having an origin corresponding to a location of the scanner 310 at a time at which the point data was obtained.

As shown by reference number 330, the ECU 112 maps the point data to cells of a grid (e.g., to cells of the grid of the static fixed coordinate system and/or the grid of the vehicle fixed coordinate system). The ECU 112 may determine a position and/or an orientation of the scanner 310 on the map and may map the point data to the cells of the static fixed coordinate system and/or the vehicle fixed coordinate system based on the position and/or the orientation of the scanner 310.

In some aspects, the point data is associated with respective coordinates, and the ECU 112 maps the point data to the cells of the grid of the static fixed coordinate system by applying coordinate transformation. For example, the coordinates of the point data can be converted to the static fixed coordinates based on the following equation:

$$\begin{bmatrix} x_{SF}^i \\ y_{SF}^i \end{bmatrix} = \begin{bmatrix} \cos(\varphi_r) & -\sin(\varphi_r) \\ \sin(\varphi_r) & \cos(\varphi_r) \end{bmatrix} \begin{bmatrix} x_{RF}^i \\ y_{RF}^i \end{bmatrix} + \begin{bmatrix} x_t \\ y_t \end{bmatrix}$$

Where:
  i is the index of the radar point returned in a current frame of point data, $\varphi_r$ is the yaw of the vehicle 110, $$\begin{bmatrix} x_t \\ y_t \end{bmatrix}$$

is the translation vector from the initial location of the vehicle 110, $$\begin{bmatrix} x_{RF}^i \\ y_{RF}^i \end{bmatrix}$$

are the coordinates of the $i_{th}$ point of point data in a reference coordinate system associated with the scanner 310, $$\begin{bmatrix} x_{SF}^i \\ y_{SF}^i \end{bmatrix}$$

are the coordinates of the $i_{th}$ point of point data in the static fixed coordinate system.

In some aspects, the ECU 112 maps the point data to the cells of the grid of the vehicle fixed coordinate system based on the following equation:

$$\begin{bmatrix} x_{VF}^i \\ y_{VF}^i \end{bmatrix} = \begin{bmatrix} \cos(\varphi_r) & -\sin(\varphi_r) \\ \sin(\varphi_r) & \cos(\varphi_r) \end{bmatrix} \begin{bmatrix} x_{RF}^i \\ y_{RF}^i \end{bmatrix} + \begin{bmatrix} x_t \\ y_t \end{bmatrix}$$

Where:
i is the index of the point data returned in a current frame of point data,
$\varphi_r$ is yaw of the vehicle 110, $$\begin{bmatrix} x_t \\ y_t \end{bmatrix}$$

is the translation vector from the initial location of the vehicle 110, $$\begin{bmatrix} x_{RF}^i \\ y_{RF}^i \end{bmatrix}$$

are the coordinates of the $i_{th}$ point of point data in the reference coordinate system associated with the scanner 310, $$\begin{bmatrix} x_{VF}^i \\ y_{VF}^i \end{bmatrix}$$

are the coordinates of the $i_{th}$ point of point data in the vehicle fixed coordinate system.

As shown by reference number 335, the ECU 112 determines occupancy status of a cell based on point data mapped to the cell. In some aspects, the occupancy status is determined based on an occupancy probability which indicates a probability of an object being located in an area on the map corresponding to the cell. In some aspects, each point of point data is associated with a probability of existence determined by the scanner 310. In some aspects, the occupancy probability of a cell is determined based at least in part on a respective probability of existence determined for one or more points of point data mapped to the cell. In some aspects, the ECU 112 may determine a posteriori occupancy probability for a cell based on a probability of existence determined for a point of point data mapped to the cell.

In some aspects, a plurality of points of point data are mapped to a cell. The ECU 112 may determine the posteriori occupancy probability for the cell based on the respective probability of existence determined by the scanner 310 for each of the plurality of points of point data. For example, the ECU 112 may determine the posteriori occupancy based on the highest probability of existence determined for the plurality of points of point data, an average of the probabilities of existence determined for the plurality of points of point data, and/or the like. In some other aspects, the ECU 112 may determine the posteriori occupancy based on a probability of existence determined for the plurality of points of point data as a whole.

In some aspects, the ECU 112 determines the occupancy probably based on an a posteriori probability for a measurement cycle in with the new data is being combined with previous data. For instance, the ECU 112 determines a posteriori probability based on a detection probability $p(g|R_{1:t}, V_{1:t})$ for cell g, where $R_{1:t}$ is the set of measurements for frames 1 to t, and $V_{1:t}$ is set of data indicating a location of the vehicle 110 for frames 1 to 1.

In some aspects, the ECU 112 determines a logs odd ratio of a posteriori probability associated with a cell. In some aspects, the ECU 112 determines the logs odd ratio of a posteriori probability based at least in part on the Bayes theorem. For example, the ECU 112 may determine the logs odd ratio ($l_t$) of the a posteriori probability ($p(g|R_{1:t}, V_{1:t})$) based on the following equation:

$$l_t = \log \frac{p(g|R_{1:t}, V_{1:t})}{1 - p(g|R_{1:t}, V_{1:t})} \qquad (1)$$

Where:
g represents the cell of for which the logs odd ratio is being determined,
$R_{1:t}$ is the set of measurements from a first frame of point data through a current frame t of point data,
$V_{1:t}$ is set of data indicating a location of the vehicle 110 from a time at which the first frame of point data was obtained until a time at which the current frame t of point data was obtained.

In some aspects, the ECU determines the logs odd ratio of a posteriori probability associated using a detection probability ($p(g|R_t, V_t)$). For example, the ECU 112 may determine the logs odd ratio ($l_t$) (e.g. instead of the above equation (1)) based on the following equation:

$$l_t = l_{t-1} + \log \frac{p(g|R_t, V_t)}{1 - p(g|R_t, V_t)} - l_0 \qquad (2)$$

where probability $p(g|R_t, V_t)$ represents a detection probability processing the senor data $R_t$ and the vehicle data $V_t$ of the current measurement. The log odds ratio of the detection probability before processing any measurements $l_0$ may be assumed as 0, since nothing is known about the surrounding environment before the first measurement.

In some aspects, the ECU 112 scales the probability of existence determined for a point of point data and determines the posteriori occupancy probability based on the scaled probability of existence. For example, the ECU 112 may scale the probability of existence determined for a point of point data to be between 0.5 through 1.0. In some aspects, the ECU 112 scales the probability of existence determined for a point of point data to obtain a scaled probability of existence $p^s(g|R_t,V_t)$ based on the equation $p^s(g|R_t,V_t)=0.5+0.5*p(g|R_t,V_t)$.

In some aspects, the ECU 112 calculates the logs odd ratio based at least in part on a degradation factor (k). The degradation factor may reduce the logs odd ratio determined for a cell based on a previous frame of point data, thereby reducing the effect of the logs odd ratio determined for the cell based on a previous frame of point data relative to the logs odd ratio determined for the cell based on a current frame of point data. In some aspects, the ECU 112 calculates the logs odd ratio of the posteriori occupancy probability based at least in part on the current measurement $p_s(g|R_t,V_t)$ as:

$$l_t = k*l_{t-1} + \log\frac{p_s(g|R_t, V_t)}{1 - p_s(g|R_t, V_t)} \quad (3)$$

The ECU 112 may convert the logs odd probability determined for a cell into an occupancy probability for the cell. In some aspects, the ECU 112 converts the logs odd probability determined into the occupancy probability for the cell based on a scaling model. The ECU 112 may initially determine that the cell is unoccupied. The ECU 112 may determine that the logs odd probability for the cell is zero based on the cell being unoccupied. The ECU 112 may simulate, for n frames of point data, an object present in the cell with detection probability $p_{th}$. The ECU 112 may assume that at the completion of the n frames of point data, the cell is occupied with probability of 100%

$$\left(e.g., l_n = \sum_{i=1}^{n} k^{i-1} * \log\frac{p_{th}}{1 - p_{th}}\right).$$

The ECU 112 may remove the detections from the cell to cause the logs odd ratio to decline for m frames of point data such that, at the end of the last $m_{th}$ frame of point data, the cell can be determined to be occupied with a probability of 0% and/or unoccupied with probability 100% (e.g., $l_m=l_n*k^m$). The ECU 112 may use the values of the logs odd ratio at the two points $l_n$ and $l_m$ to convert logs odd ratio for the cell to an occupancy probability for the cell.

In some aspects, the ECU 112 generates an occupancy grid based on the occupancy probabilities determined for the plurality of cells. The occupancy grid may include a plurality of occupancy cells overlayed on top of the plurality of cells of the static fixed coordinate system and the plurality of cells of the vehicle fixed coordinate system such that the borders of each occupancy cell align with the borders of a respective cell of the static fixed coordinate system and a respective cell of the vehicle fixed coordinate system. The ECU 112 may associate each occupancy cell with an occupancy probability determined for the cell.

As shown by reference number 340, the ECU 112 may adjust the occupancy probability based on characteristics associated with the occupancy grid. In some aspects, the characteristic is associated with the ECU 112 determining that an occupancy cell is associated with a relatively low occupancy probability (e.g., an occupancy probability that is less than a threshold occupancy probability) and is bordered by two or more other occupancy cells that are associated with a relatively high occupancy probability (e.g., an occupancy probability that is greater than a threshold occupancy probability).

The ECU 112 may modify the occupancy probability associated with the cell based on the occupancy probabilities associated with the two or more other cells. For example, the ECU 112 may modify the occupancy probability of the occupancy cell based on a highest occupancy value of the occupancy probabilities of the two or more other occupancy cells, an average of the occupancy probabilities of the two or more other occupancy cells, an average of the occupancy probabilities of the two or more other occupancy cells and the occupancy probability of the cell, and/or the like.

In some aspects, the characteristic is associated with the occupancy probability associated with an occupancy cell satisfying a permanence threshold. In some aspects, the characteristic is associated with the ECU 112 determining that an occupancy cell corresponds to a shadowed cell.

As shown by reference number 345, the ECU 112 generates one or more occupancy grid frames. An occupancy grid frame may be generated based at least in part on the occupancy grid. In some aspects, the one or more occupancy grid frames might be generated based on converting the occupancy probability of a cell to a first value or a second value. The first value may indicate that the cell corresponds to an area on the map at which an object is located (e.g., an occupied cell). The second value may indicate that the cell corresponds to an area on the map at which an object is not located (e.g., an unoccupied cell).

In some aspects, the ECU 112 may convert the occupancy probability of a cell to the first value or the second value based at least in part on whether the occupancy probability associated with the cell satisfies a probability threshold. For example, the ECU 112 may convert the occupancy probability of a cell to the first value when the occupancy probability of the cell is greater than, or equal to, a probability threshold (e.g., 75%, 90%, 95%, and/or the like) and may convert the occupancy probability of the cell to the second value when the occupancy probability of the cell is less than the probability threshold.

As shown by reference number 350, the ECU 112 (e.g., the controller 320) controls the vehicle 110 according to the occupancy grid. The ECU 112 may identify free space that the vehicle 110 may occupy (e.g., travel through) based at least in part on the occupancy grid.

In some aspects, the ECU 112 identifies the free space based at least in part on a current trajectory of the vehicle 110. The ECU 112 may obtain data indicating the current trajectory of the vehicle 110 from one or more sensors 240, such as a location sensor, a gyroscope, an accelerometer, a speed sensor, a motion sensor, and/or the like. Alternatively, and/or additionally, the ECU 112 may determine the current trajectory of the vehicle 110 based at least in part on successive frames of point data obtained by the scanner 310. For example, the ECU 112 may determine a location of the vehicle 110 for each frame of point data, of the successive frames of point data. The ECU 112 may determine a current trajectory of the vehicle 110 based at least in part on the determined locations of the vehicle 110.

For example, the ECU 112 may plot the locations of the vehicle 110 on the map. The ECU 112 may determine a line intersecting two or more of the determined locations. The ECU 112 may determine a direction at which the line extends on the map. The ECU 112 may determine the current trajectory of the vehicle 110 based at least in part on the direction at which the line extends on the map.

In some aspects, the ECU 112 determines a future potential location of the vehicle 110 based at least in part on the current trajectory of the vehicle 110. For example, the ECU 112 may identify, from the map, a roadway the vehicle 110 may travel along based at least in part on a current location of the vehicle 110, the current trajectory of the vehicle 110, data identifying a destination associated with the vehicle 110 that is input into a navigation device associated with the vehicle 110 and/or the ECU 112, and/or the like.

The ECU 112 may identify free space along the current vehicle trajectory (e.g., a roadway extending from a current location of the vehicle 110 to the future potential location of the vehicle 110). The ECU 112 may identify the free space based at least in part on a narrowest distance between the border of cells corresponding to occupied space along the current trajectory of the vehicle 110.

In some aspects, the ECU 112 defines the current vehicle trajectory as a baseline trajectory. The ECU 112 may extend the current vehicle trajectory a predetermined distance to an area (e.g., the future potential location of the vehicle 110) based at least in part on an orientation of the vehicle 110 at each position corresponding to extending the current vehicle trajectory the predetermined distance.

The predetermined distance at which the current vehicle is extended may correspond to a frequency of interval (FoI) along the trajectory. The predetermined distance and/or the FoI may be determined based on a rate at which the scanner 310 obtains the frames of point data, a current speed of the vehicle 110, and/or the like. The ECU 112 may divide the FoI into intervals with a certain length along the current vehicle trajectory. In some aspects, the intervals are perpendicular to an orientation of the vehicle 110 at each point.

The ECU 112 may identify the occupancy cells in which the position of the vehicle 110 are located at each FoI as a set of baseline occupancy cells. The ECU 112 may utilize a line drawing algorithm (e.g., a Bresenham's line algorithm) to determine points of an n-dimension raster associated with a line extending from a cell associated with each FoI to an occupied cell and in a direction perpendicular to an orientation of the vehicle 110 at each FoI.

For each baseline occupancy cell, the ECU 112 may identify, based on the lines extending from the baseline occupancy cells, respective occupied cells having a smallest distance to the baseline occupancy cells relative to other occupied cells. The ECU 112 may determine a width of a free space interval associated with a baseline occupancy cell based at least in part on the distance to the baseline occupancy cell from the occupied cell having the smallest distance to the baseline occupancy cell. In some aspects, the ECU 112 may identify occupancy cells associated with each FoI, which are closer to the baseline grid cells than the width of the free space interval, as corresponding to areas of free space on the map. The ECU 112 may control an operation of the vehicle 110 (e.g., turn, stop, slow down, speed up, change lanes, and/or the like) based at least in part on the areas of free space on the map.

As indicated above, FIG. 3 is provided as an example. Other examples may differ from what is described with respect to FIG. 3.

FIG. 4 is a diagram illustrating an example 400 associated with occupancy mapping for autonomous control of a vehicle, in accordance with the present disclosure.

As shown by reference number 415, the ECU 112 determines an occupancy probability of a cell based at least in part on the point data. In some aspects, the ECU 112 determines the occupancy probability of a cell based at least in part on a frame of point data, in a manner similar to that described above with respect to FIG. 3. As shown in FIG. 4, the ECU 112 determines an occupancy probability of 98% for cell 405*a* and an occupancy probability of 70% for cell 410*a*.

In some aspects, the ECU 112 determines whether the occupancy probability of a cell satisfies a permanence threshold (e.g., 80%, 85%, 95%, and/or the like). When an occupied cell is no longer within a field of view of the scanner 310, the degradation factor used to calculate the logs odd ratio for the occupied cell (described above with respect to FIG. 3) may cause the occupancy probability associated with the cell to decrease over time (e.g., over successive frames of point data) which may result in the cell being determined to be an unoccupied cell. The ECU 112 may prevent the occupancy probability of a cell from decreasing over time when the occupancy probability of the cell satisfies the permanence threshold.

In some aspects, the ECU 112 prevents the occupancy probability of a cell from decreasing over a duration of a session. In some aspects, a session corresponds to a time period associated with the vehicle 110 traveling from an initial location to a destination, a time period associated with the vehicle 110 transitioning from a first drive mode (e.g., park) to a second drive mode (e.g., drive) and back to the first drive mode (e.g., park), a fixed period of time (e.g., 10 minutes, 1 hour, 1 day, and/or the like), a period of time determined based on a user input (e.g., a driver of the vehicle 110 selecting, via a user interface associated with the vehicle 110, an input associated with starting a session and the driving subsequently selecting, via the user interface, an input associated with ending the session), and/or the like.

Alternatively, and/or additionally, the ECU 112 prevents the occupancy probability of a cell from decreasing over a duration of a plurality of sessions. For example, the ECU 112 may prevent the occupancy probability of a cell from decreasing over a duration of each session occurring during a time period (e.g., an hour, a day, a week, and/or the like), during a quantity of sessions determined based on information input by a driver of the vehicle 110, and/or the like.

As shown by reference number 420, the ECU 112 determines that the occupancy probability of cell 405*a* satisfies a permanence threshold. As shown by reference number 425, the ECU 112 designates a cell of an occupancy grid associated with a subsequent frame of point data and corresponding to the cell 405*a* (e.g., cell 405*b*) as occupied for the remaining duration of the session.

As shown in FIG. 4, the ECU 112 may determine that the occupancy probability of cell 410*a* does not satisfy the permanence threshold and may not designate a cell of an occupancy grid associated with a subsequent frame of point data and corresponding to the cell 410*a* (e.g., cell 410*b*) as occupied for the remaining duration of the session. As also shown in FIG. 4, the occupancy probability associated with the cell 410*b* to decrease over time relative to the occupancy probability associated with the cell 410*a* based at least in part on the ECU 112 not designating the cell 410*a* as occupied for the remaining duration of the session.

As indicated above, FIG. 4 is provided as an example. Other examples may differ from what is described with respect to FIG. 4.

Figure 5:
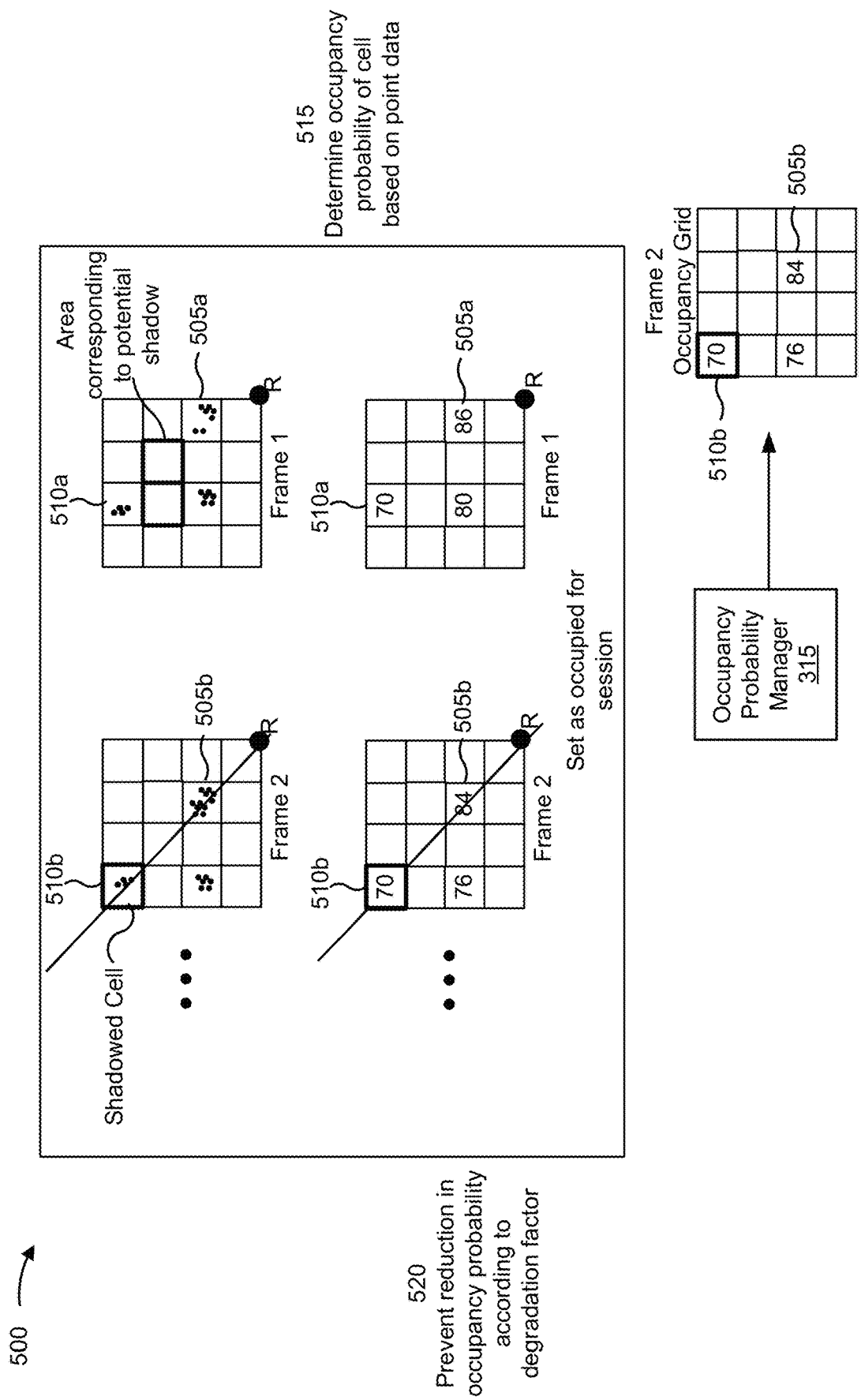

FIG. 5 is a diagram illustrating an example 500 associated with occupancy mapping for autonomous control of a vehicle, in accordance with the present disclosure. As shown in FIG. 5, the ECU 112 (e.g., the occupancy probability manager 315) may determine the occupancy status of an occupancy cell based at least in part on determining that the occupancy cell corresponds to a shadowed cell. A shadowed cell may refer to a cell corresponding to a location on the map at which a first object is located and which a second object at a location on the map corresponding to another cell is positioned between the first object and the scanner 310. The location of the second object may prevent the scanner 310 from obtaining point data associated with the first object. For example, the scanner 310 may include a radar scanner 245 (and/or a LIDAR scanner 250), and the second object may prevent (e.g., block) a portion of the radio waves emitted by the radar scanner 245 (and/or light waves emitted by the LIDAR scanner 250) from reaching the first object and/or may prevent a portion of the radio waves reflected off of the first object from reaching the radar scanner 245 (and/or a portion of the light waves reflected off of the first object from reaching the LIDAR scanner 250).

As shown by reference number 515, the ECU 112 determines an occupancy probability of a cell based on a frame of point data. In some aspects, the ECU 112 determines an occupancy probability of a cell based on a frame of point data in a manner similar to that described above with respect to FIG. 3.

In some aspects, for each point of point data included in a frame, the ECU 112 may determine an area corresponding to a potential shadow created by the point of point data. In some aspects, the ECU 112 determines the area corresponding to the potential shadow of a point of point data based on a cross section associated with the point of point data. For example, the scanner 310 may include a radar scanner 245 and the point of point data may include information identifying a radar cross section associated with the point of point data. The ECU 112 may determine the area corresponding to the potential shadow based on the square root of the radar cross section.

In some aspects, the ECU 112 determines a width of the area corresponding to the potential shadow based on the square root of the radar cross section and determines the area corresponding to the potential shadow based on the width. For example, the ECU 112 may determine a rectangular area having a width corresponding to the width of the area corresponding to the potential shadow and a length extending behind the cell relative to a location R of the scanner 310.

As shown in FIG. 5, the ECU 112 determines an area corresponding to a potential shadow for point data included in cell 505a. The ECU 112 determines that the cells within the area corresponding to the potential shadow do not include any point data. The ECU 112 may determine the occupancy probability for cell 510a in a manner similar to that described above with respect to FIG. 3 based at least in part on the cell 510a not being included in the area corresponding to the potential shadow.

The ECU 112 may determine an area corresponding to a potential shadow for the point data included in cell 505b for a subsequent frame of point data (e.g., Frame 2, as shown in FIG. 5) in a similar manner. The ECU 112 may determine that the cell 510b is included in the area corresponding to the potential shadow.

As shown by reference number 520, the ECU 112 prevents reduction in occupancy probability according to the degradation factor used to compute the logs odd ratio for the cell 510b based on the cell 510b being included in the area corresponding to the potential shadow. In some aspects, the ECU 112 prevents the reduction in the occupancy probability in a manner similar to that described above with respect to FIG. 3. In this way, the ECU 112 may prevent a cell from being determined to be an unoccupied cell based on the cell being within a shadow of an object located in an area corresponding to another cell.

As indicated above, FIG. 5 is provided as an example. Other examples may differ from what is described with respect to FIG. 5.

Figure 6:
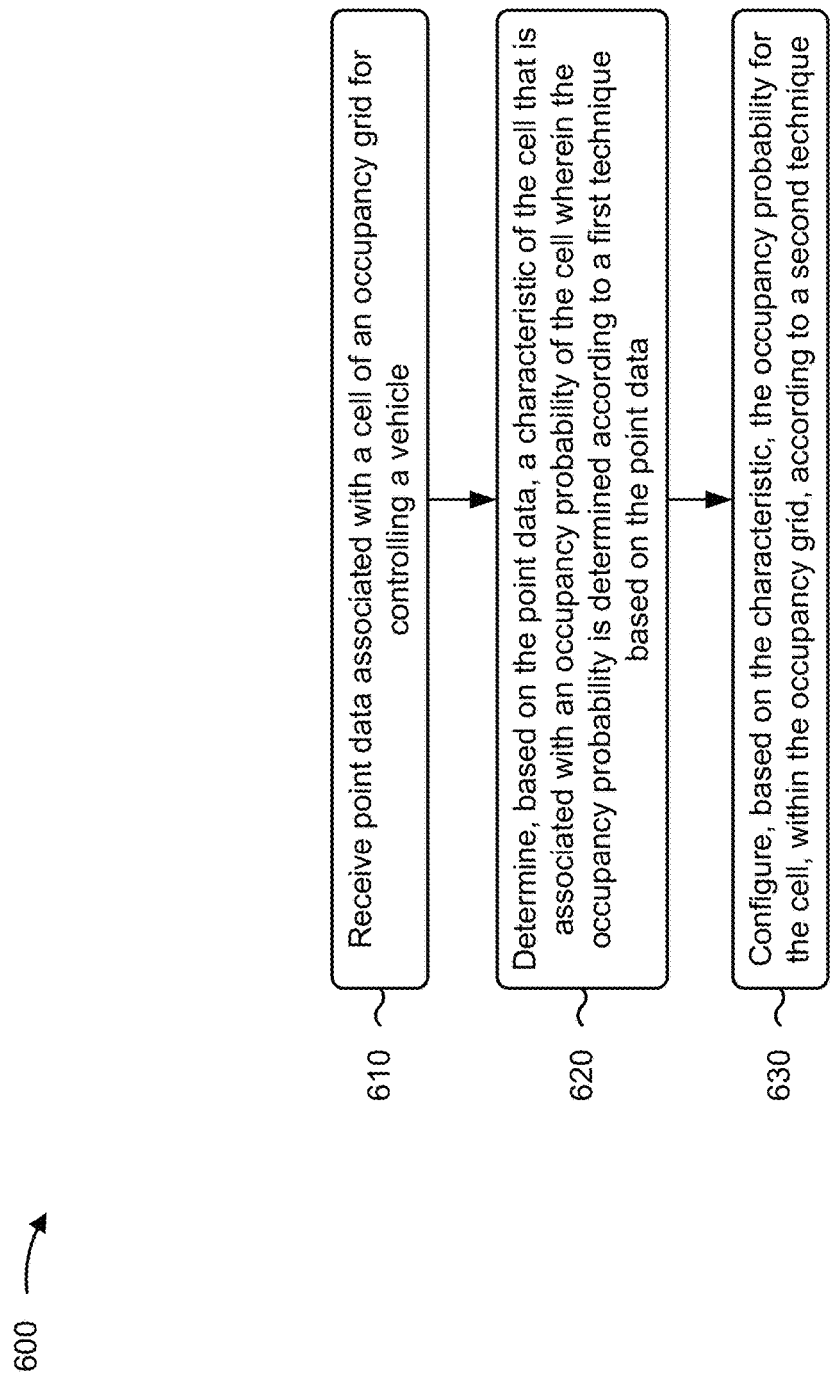
FIGS. 6-9 are flowcharts of example processes associated with occupancy mapping for autonomous control of a vehicle, in accordance with the present disclosure.

FIG. 6 is a diagram illustrating an example process 600 performed, for example, by a device, in accordance with the present disclosure. Example process 600 is an example where the device (e.g., ECU 112) performs operations associated with occupancy mapping for autonomous control of a vehicle. In some examples, the device is a device using the bus 205, the processor 210, the memory 215, the storage component 220, the input component 225, the output component 230, the communication interface 235, the sensor 240, the radar scanner 245, and/or the LIDAR scanner 250.

As shown in FIG. 6, in some aspects, process 600 may include receiving point data associated with a cell of an occupancy grid for controlling a vehicle (block 610). As further shown in FIG. 6, in some aspects, process 600 may include determining, based on the point data, a characteristic of the cell that is associated with an occupancy probability of the cell, wherein the occupancy probability is determined based on the point data (block 620).

As further shown in FIG. 6, in some aspects, process 600 may include configuring, based on the characteristic of the cell, the occupancy probability for the cell within the occupancy grid (block 630).

Process 600 may include additional aspects, such as any single aspect or any combination of aspects described below and/or in connection with one or more other processes described elsewhere herein.

In a first aspect, the characteristic of the cell comprises the cell having an occupancy probability that is greater than a probability threshold, and wherein the occupancy probability for the cell is determined to cause the occupancy grid to indicate that the cell is occupied for a remaining duration of a session for controlling the vehicle.

In a second aspect, alone or in combination with the first aspect, the point data is associated with a set of points in the cell, and wherein the point data comprises at least one of an indication of a probability that the set of points represents an object that is occupying the cell, or an indication of a size of an object that is represented by the set of points (e.g., a radar cross section associated with the object).

In a third aspect, alone or in combination with one or more of the first and second aspects, the occupancy probability is determined based on a weighted result associated with a probability of existence of an object associated with a set of points and a radar cross section measurement associated with the set of points.

In a fourth aspect, alone or in combination with one or more of the first through third aspects, process 600 involves determining the occupancy probability for a frame associated with the point data and reducing the occupancy probability for the cell when the cell is no longer within range of the scanner.

In a fifth aspect, alone or in combination with one or more of the first through fourth aspects, process 600 comprises at least one of indicating that the cell is occupied for a remaining duration of a session for controlling the vehicle, or preventing a reduction to the occupancy probability for a duration of time that the characteristic is determined.

In a sixth aspect, alone or in combination with one or more of the first through fifth aspects, the technique for configuring the occupancy probability for cells of the occupancy grid based on the techniques as determined overrides the technique for determining the occupancy probability based on the point data.

In a seventh aspect, alone or in combination with one or more of the first through sixth aspects, the point data is associated with a frame of the occupancy grid and the occupancy probability of the cell is determined for the frame.

In an eighth aspect, alone or in combination with one or more of the first through seventh aspects, process 600 includes performing, based on the configured occupancy probability, an action associated with controlling the vehicle using the occupancy grid with the occupancy probability for the cell configured according to the second technique.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
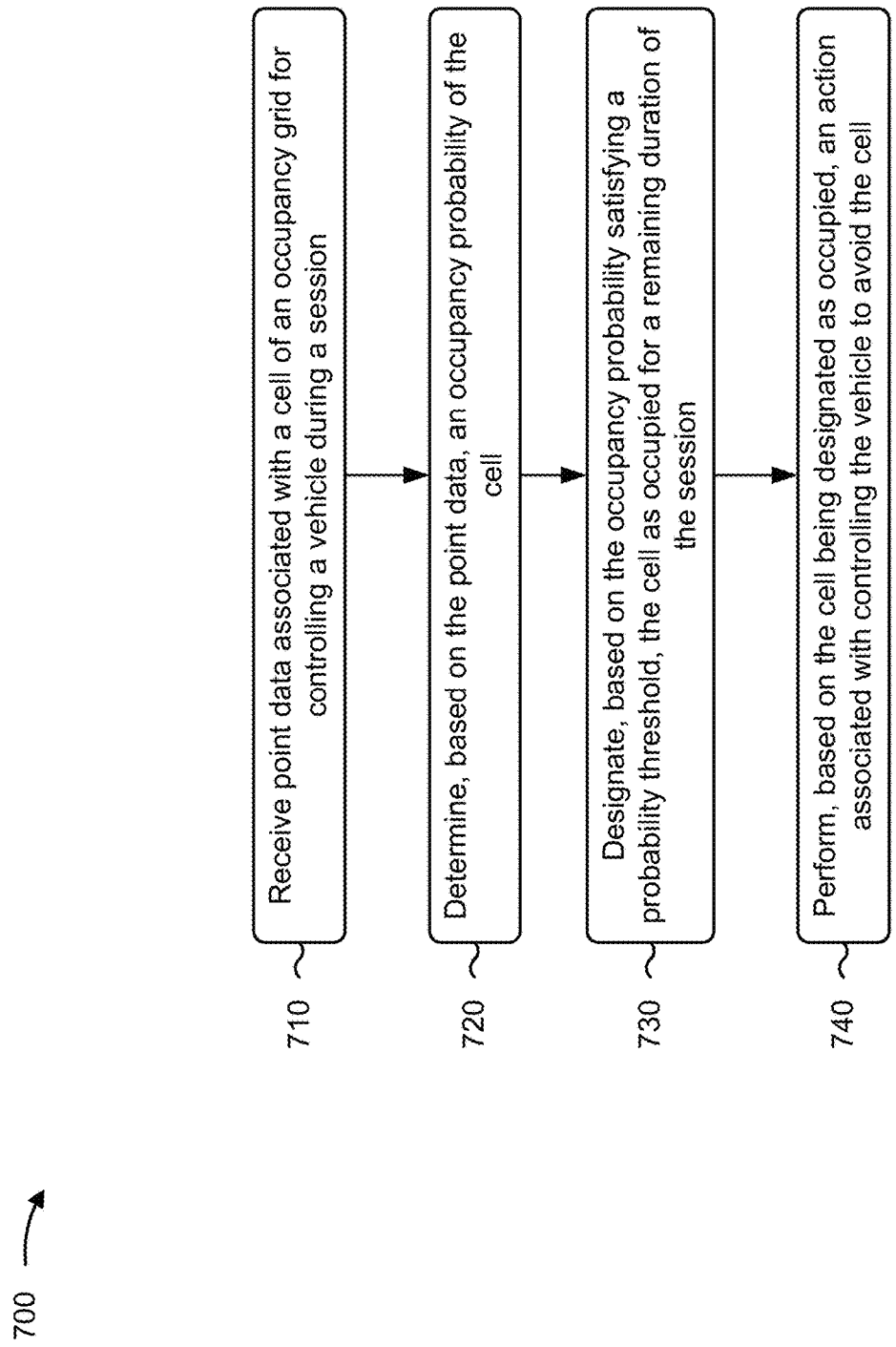

FIG. 7 is a diagram illustrating an example process 700 performed, for example, by a device, in accordance with the present disclosure. Example process 700 is an example where the device (e.g., ECU 112) performs operations associated with occupancy mapping for autonomous control of a vehicle. In some examples, the device is a device using the bus 205, the processor 210, the memory 215, the storage component 220, the input component 225, the output component 230, the communication interface 235, the sensor 240, the radar scanner 245, and/or the LIDAR scanner 250.

As shown in FIG. 7, in some aspects, process 700 may include receiving point data associated with a cell of an occupancy grid for controlling the vehicle during a session (block 710).

As further shown in FIG. 7, in some aspects, process 700 may include determining, based on the point data, an occupancy probability of the cell (block 720).

As further shown in FIG. 7, in some aspects, process 700 may include designating, based on the occupancy probability satisfying a probability threshold, the cell as occupied for a remaining duration of the session (block 730).

As further shown in FIG. 7, in some aspects, process 700 may include performing, based on the cell being designated as occupied, an action associated with controlling the vehicle to avoid the cell (block 740).

Process 700 may include additional aspects, such as any single aspect or any combination of aspects described below and/or in connection with one or more other processes described elsewhere herein.

In a first aspect, the point data is associated with a set of points in the cell, and wherein the point data comprises at least one of an indication of a probability that the set of points represents an object that is occupying the cell, or an indication of a size of an object that is represented by the set of points (e.g., radar cross section associated with the object).

In a second aspect, alone or in combination with the first aspect, the occupancy probability is determined based on a weighted scoring system that utilizes a combination of the probability of existence value and the radar cross section value, wherein a weight that is applied to the probability of existence value is different from a weight that is applied to the radar cross section value.

In a third aspect, alone or in combination with one or more of the first and second aspects, designating the cell as occupied for the remaining duration of the session comprises preventing a technique for determining the occupancy probability from reducing the occupancy probability of the cell in the occupancy grid for the remaining duration of the session.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
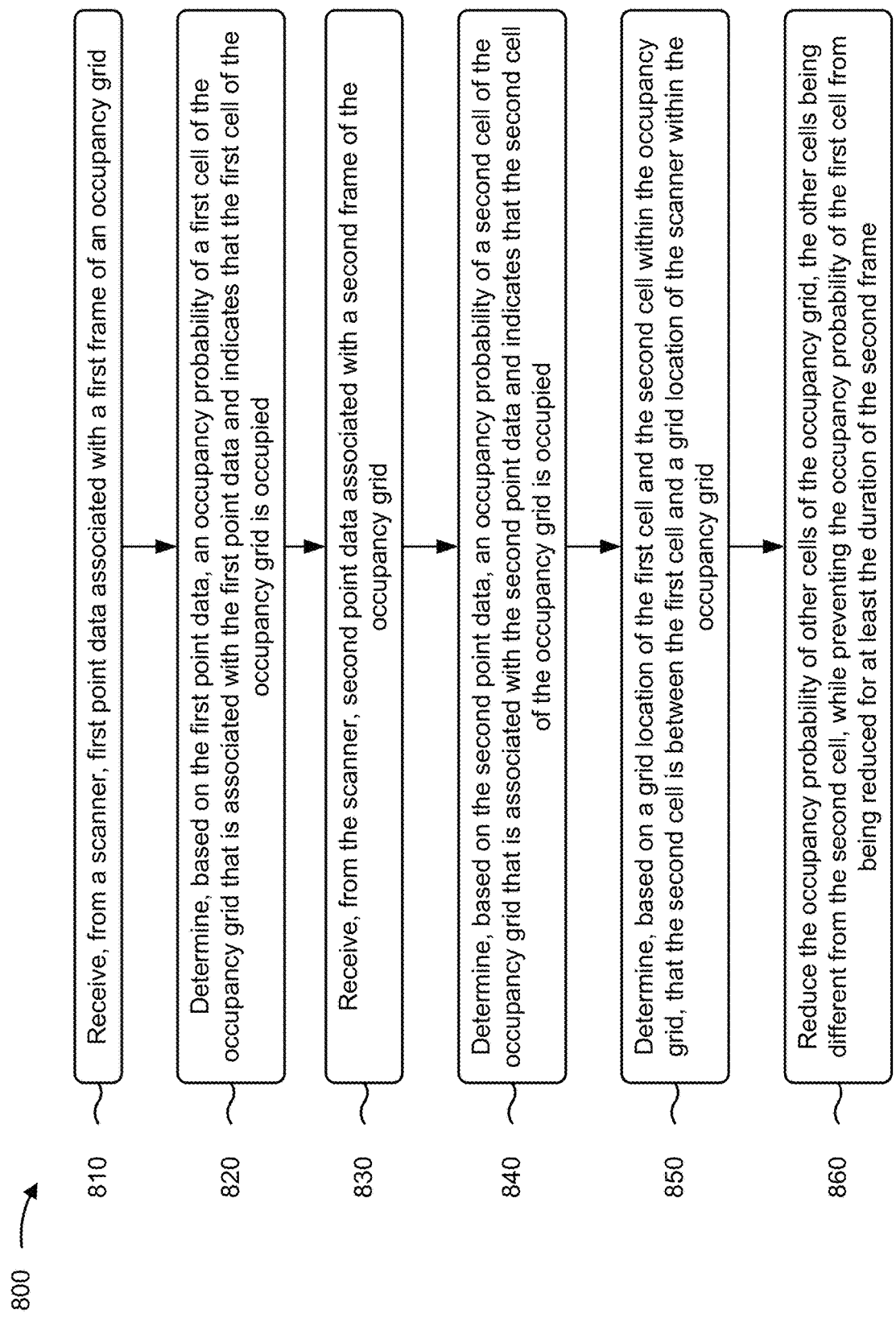

FIG. 8 is a diagram illustrating an example process 800 performed, for example, by a device, in accordance with the present disclosure. Example process 800 is an example where the device (e.g., ECU 112) performs operations associated with occupancy mapping for autonomous control of a vehicle. In some examples, the device is a device using the bus 205, the processor 210, the memory 215, the storage component 220, the input component 225, the output component 230, the communication interface 235, the sensor 240, the radar scanner 245, and/or the LIDAR scanner 250.

As shown in FIG. 8, in some aspects, process 800 may include receiving, from a scanner, first point data associated with a first frame of an occupancy grid (block 810).

As further shown in FIG. 8, in some aspects, process 800 may include determining, based on the first point data, an occupancy probability of a first cell of the occupancy grid that is associated with the first point data and indicates that the first cell of the occupancy grid is occupied (block 820).

As further shown in FIG. 8, in some aspects, process 800 may include receiving, from the scanner, second point data associated with a second frame of the occupancy grid (block 830).

As further shown in FIG. 8, in some aspects, process 800 may include determining, based on the second point data, an occupancy probability of a second cell of the occupancy grid that is associated with the second point data and indicates that the second cell of the occupancy grid is occupied (block 840).

As further shown in FIG. 8, in some aspects, process 800 may include determining, based on a grid location of the first cell and the second cell within the occupancy grid, that the second cell is between the first cell and a grid location of the scanner within the occupancy grid (block 850).

As further shown in FIG. 8, in some aspects, process 800 may include reducing the occupancy probability of other cells of the occupancy grid, the other cells being different from the second cell, while preventing the occupancy probability of the first cell from being reduced for at least the duration of the second frame (block 860).

Process 800 may include additional aspects, such as any single aspect or any combination of aspects described below and/or in connection with one or more other processes described elsewhere herein.

In a first aspect, the first point data is associated with a set of points with grid locations in the first cell, and wherein the point data comprises at least one of a probability of existence score that identifies a probability that the set of points represents an object that is occupying the first cell, or a radar cross section score that is indicative of a size of an object that is represented by set of points.

In a second aspect, alone or in combination with the first aspect, the occupancy probability for the first cell in the first frame is determined based on a weighted score associated with a probability of existence of an object associated with a set of points of the first point data and a radar cross section measurement associated with the set of points of the first point data.

In a third aspect, alone or in combination with one or more of the first and second aspects, the occupancy probability for the second cell in the second frame is determined based on a weighted score associated with a probability of existence of an object associated with a set of points of the second point data and a radar cross section measurement associated with the set of points of the first point data.

In a fourth aspect, alone or in combination with one or more of the first through third aspects, the occupancy probability of the second cell indicates that the second cell of the occupancy grid is occupied in case an occupancy probability of the second cell is greater than a probability threshold.

In a fifth aspect, alone or in combination with the fourth aspect, based on the occupancy probability of the second cell being greater than the probability threshold, the second cell is designated as occupied for a remaining duration of a session associated with the scanner.

In a sixth aspect, alone or in combination with one or more of the first through fourth aspects, the preventing the occupancy probability of the first cell from being reduced comprises fixing, for the duration of the second frame, the occupancy probability of the first cell as determined according to the first frame.

In a seventh aspect, alone or in combination with one or more of the first through fifth aspects, the determining that the second cell is between the first cell and the grid location of the scanner comprises determining that the grid location of first cell is aligned with the grid location of the second cell and the grid location of the scanner within the occupancy grid.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
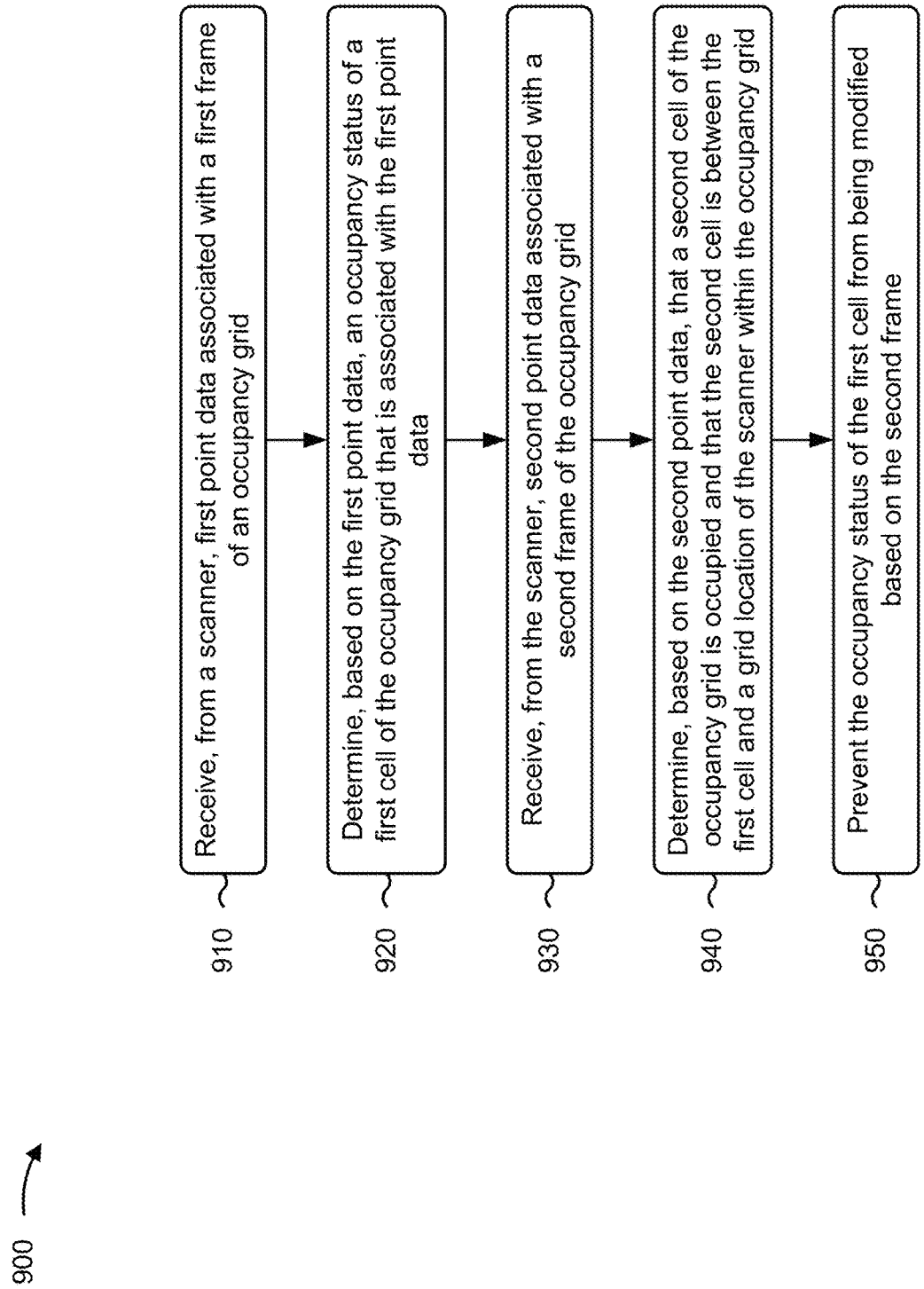

FIG. 9 is a diagram illustrating an example process 900 performed, for example, by a device, in accordance with the present disclosure. Example process 900 is an example where the device (e.g., ECU 112) performs operations associated with occupancy mapping for autonomous control of a vehicle. In some examples, the device is a device using the bus 205, the processor 210, the memory 215, the storage component 220, the input component 225, the output component 230, the communication interface 235, the sensor 240, the radar scanner 245, and/or the LIDAR scanner 250.

As shown in FIG. 9, in some aspects, process 900 may include receiving, from a scanner, first point data associated with a first frame of an occupancy grid (block 910).

As further shown in FIG. 9, in some aspects, process 900 may include determining, based on the first point data, an occupancy status of a first cell of the occupancy grid that is associated with the first point data (block 920).

As further shown in FIG. 9, in some aspects, process 900 may include receiving, from the scanner, second point data associated with a second frame of the occupancy grid (block 930).

As further shown in FIG. 9, in some aspects, process 900 may include determining, based on the second point data, that a second cell of the occupancy grid is occupied and that the second cell is between the first cell and a grid location of the scanner within the occupancy grid (block 940).

As further shown in FIG. 9, in some aspects, process 900 may include preventing the occupancy status of the first cell from being modified based on the second frame (block 950).

Process 900 may include additional aspects, such as any single aspect or any combination of aspects described below and/or in connection with one or more other processes described elsewhere herein.

In a first aspect, the first point data is associated with a set of points in the first cell, and wherein the point data comprises at least one of a set of coordinates corresponding to a location an on object associated with the first cell, a set of velocities associated with the object in each direction of a coordinate system corresponding to the object, a first indication that identifies a probability that the set of points represents an object that is occupying the cell, or a second indication that is indicative of a size of an object that is represented by set of points.

In a second aspect, alone or in combination with the first aspect, the occupancy status for the cell in the first frame is determined based on a probability of existence of an object associated with a set of points of the first point data and a radar cross section measurement associated with the set of points of the first point data.

In a third aspect, alone or in combination with one or more of the first and second aspects, the second cell is determined to be occupied based on a probability of existence of an object associated with a set of points of the second point data and a radar cross section measurement associated with the set of points of the first point data.

In a fourth aspect, alone or in combination with one or more of the first through third aspects, the second cell is determined to be occupied based on an occupancy probability of the second cell being greater than a probability threshold.

In a fifth aspect, based on the occupancy status indicating that an occupancy probability of the second cell is greater than the probability threshold, the second cell is designated as occupied for a remaining duration of a session associated with the scanner.

In a sixth aspect, alone or in combination with one or more of the first through fourth aspects, preventing the occupancy status of the first cell from being modified comprises fixing, for the second frame, the occupancy status of the first cell as determined according to the first frame.

In a seventh aspect, alone or in combination with one or more of the first through fifth aspects, the second cell is determined to be between the first cell and the grid location of the scanner based on the first cell being aligned with the second cell and the grid location.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method, comprising: receiving, by a device and from a scanner, first point data associated with a first frame of an occupancy grid; determining, by the device and based on the first point data, an occupancy probability of a first cell of the occupancy grid that is associated with the first point data and indicates that the first cell of the occupancy grid is occupied; receiving, by the device and from the scanner, second point data associated with a second frame of the occupancy grid; determining, by the device and based on the second point data, an occupancy probability of a second cell of the occupancy grid that is associated with the second point data and indicates that the second cell of the occupancy grid is occupied; determining, by the device and based on a grid location of the first cell and the second cell within the occupancy grid, that the second cell is between the first cell and a grid location of the scanner within the occupancy grid; and reducing, by the device, the occupancy probability of other cells of the occupancy grid, the other cells being different from the second cell, while preventing the occupancy probability of the first cell from being reduced for at least the duration of the second frame.

Aspect 2: The method of Aspect 1, wherein the first point data is associated with a set of point with grid locations in the first cell, and wherein the point data comprises a probability of existence score that identifies a probability that the set of points represents an object that is occupying the first cell, and a radar cross section score that is indicative of a size of an object that is represented by set of points.

Aspect 3: The method of one or more of Aspects 1 and 2, wherein the occupancy probability for the first cell in the first frame is determined based on a weighted score associated with a probability of existence of an object associated with a set of points of the first point data and a radar cross section measurement associated with the set of points of the first point data.

Aspect 4: The method of one or more of Aspects 1 through 3, wherein the occupancy probability for the second cell in the second frame is determined based on a weighted score associated with a probability of existence of an object associated with a set of points of the second point data and a radar cross section measurement associated with the set of points of the first point data.

Aspect 5: The method of one or more of Aspects 1 through 4, wherein the occupancy probability of the second cell indicates that the second cell of the occupancy grid is occupied in case an occupancy probability of the second cell is greater than a probability threshold.

Aspect 6: The method of Aspect 5, wherein, based on the occupancy probability of the second cell being greater than the probability threshold, the second cell is designated as occupied for a remaining duration of a session associated with the scanner.

Aspect 7: The method of one or more of Aspects 1 through 6, wherein the preventing the occupancy probability of the first cell from being reduced comprises fixing, for the duration of the second frame, the occupancy probability of the first cell as determined according to the first frame.

Aspect 8: The method of one or more of Aspects 1 through 7, wherein the determining that the second cell is between the first cell and the grid location of the scanner comprises determining that the grid location of first cell is aligned with the grid location of the second cell and the grid location of the scanner within the occupancy grid.

Aspect 9: A method, comprising receiving, by a device, point data associated with a cell of an occupancy grid for controlling the vehicle during a session; determining, by the device and based on the point data, an occupancy probability of the cell; designating, by the device and based on the occupancy probability satisfying a probability threshold, the cell as occupied for a remaining duration of the session; and performing, by the device and based on the cell being designated as occupied, an action associated with controlling the vehicle to avoid the cell.

Aspect 10: The method of Aspect 9, wherein the point data is associated with a set of points in the cell, and wherein the point data comprises at least one of: a probability of existence score that identifies a probability that the set of points represents an object that is occupying the cell, or a radar cross section score that is indicative of a size of an object that is represented by the set of points.

Aspect 11: The method of Aspect 10, wherein the occupancy probability is determined based on a weighted scoring system that utilizes a combination of the probability of existence score and the radar cross section score, wherein a weight that is applied to the probability of existence score is different from a weight that is applied to the radar cross section score.

Aspect 12: The method of one or more of Aspects 9 through 11, wherein designating the cell as occupied for the remaining duration of the session comprises: preventing a technique for determining the occupancy probability from reducing the occupancy probability of the cell in the occupancy grid for the remaining duration of the session.

Aspect 13: A method comprising: receiving, by a device and from a scanner, first point data associated with a first frame of an occupancy grid; determining, by the device and based on the first point data, an occupancy probability of a first cell of the occupancy grid that is associated with the first point data and indicates that the first cell of the occupancy grid is occupied; receiving, by the device and from the scanner, second point data associated with a second frame of the occupancy grid; determining, by the device and based on the second point data, an occupancy probability of a second cell of the occupancy grid that is associated with the second point data and indicates that the second cell of the occupancy grid is occupied; determining, by the device and based on a grid location of the first cell and the second cell within the occupancy grid, that the second cell is between the first cell and a grid location of the scanner within the occupancy grid; and reducing, by the device, the occupancy probability of other cells of the occupancy grid, the other cells being different from the second cell, while preventing the occupancy probability of the first cell from being reduced for at least the duration of the second frame.

Aspect 14: The method of Aspect 13, wherein the first point data is associated with a set of points with grid locations in the first cell, and wherein the point data comprises: a probability of existence score that identifies a probability that the set of points represents an object that is occupying the first cell, and a radar cross section score that is indicative of a size of an object that is represented by set of points.

Aspect 15: The method of Aspects 13 and/or 14, wherein the occupancy probability for the first cell in the first frame is determined based on a weighted score associated with a probability of existence of an object associated with a set of points of the first point data and a radar cross section measurement associated with the set of points of the first point data.

Aspect 16: The method of Aspects 13 through 15, wherein the occupancy probability for the second cell in the second frame is determined based on a weighted score associated with a probability of existence of an object associated with a set of points of the second point data and a radar cross section measurement associated with the set of points of the first point data.

Aspect 17: The method of Aspects 13 through 16, wherein the occupancy probability of the second cell indicates that the second cell of the occupancy grid is occupied in case an occupancy probability of the second cell is greater than a probability threshold.

Aspect 18: The method of Aspect 17, wherein, based on the occupancy probability of the second cell being greater than the probability threshold, the second cell is designated as occupied for a remaining duration of a session associated with the scanner.

Aspect 19: The method of Aspects 13 through 18, wherein the preventing the occupancy probability of the first cell from being reduced comprises: fixing, for the duration of the second frame, the occupancy probability of the first cell as determined according to the first frame.

Aspect 20: The method of Aspects 13 through 19, wherein the determining that the second cell is between the first cell and the grid location of the scanner comprises: determining that the grid location of first cell is aligned with the grid location of the second cell and the grid location of the scanner within the occupancy grid.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 1 through 8.

Aspect 22: A device for wireless communication, comprising a memory and one or more processors coupled to the memory, the one or more processors configured to perform the method of one or more of Aspects 1 through 8.

Aspect 23: An apparatus for wireless communication, comprising at least one means for performing the method of one or more of Aspects 1 through 8.

Aspect 24: A non-transitory computer-readable medium storing code for wireless communication, the code comprising instructions executable by a processor to perform the method of one or more of Aspects 1 through 8.

Aspect 25: A non-transitory computer-readable medium storing a set of instructions for wireless communication, the set of instructions comprising one or more instructions that, when executed by one or more processors of a device, cause the device to perform the method of one or more of Aspects 1 through 8.

Aspect 26: An apparatus for wireless communication at a device, comprising a processor; memory coupled with the processor; and instructions stored in the memory and executable by the processor to cause the apparatus to perform the method of one or more of Aspects 9 through 12.

Aspect 27: A device for wireless communication, comprising a memory and one or more processors coupled to the memory, the one or more processors configured to perform the method of one or more of Aspects 9 through 12.

Aspect 28: An apparatus for wireless communication, comprising at least one means for performing the method of one or more of Aspects 9 through 12.

Aspect 29: A non-transitory computer-readable medium storing code for wireless communication, the code comprising instructions executable by a processor to perform the method of one or more of Aspects 9 through 12.

Aspect 30: A non-transitory computer-readable medium storing a set of instructions for wireless communication, the set of instructions comprising one or more instructions that, when executed by one or more processors of a device, cause the device to perform the method of one or more of Aspects 9 through 12.

Aspect 31: An apparatus for wireless communication at a device, comprising a processor; memory coupled with the processor; and instructions stored in the memory and executable by the processor to cause the apparatus to perform the method of one or more of Aspects 13 through 20.

Aspect 32: A device for wireless communication, comprising a memory and one or more processors coupled to the memory, the one or more processors configured to perform the method of one or more of Aspects 13 through 20.

Aspect 33: An apparatus for wireless communication, comprising at least one means for performing the method of one or more of Aspects 13 through 20.

Aspect 34: A non-transitory computer-readable medium storing code for wireless communication, the code comprising instructions executable by a processor to perform the method of one or more of Aspects 13 through 20.

Aspect 35: A non-transitory computer-readable medium storing a set of instructions for wireless communication, the set of instructions comprising one or more instructions that, when executed by one or more processors of a device, cause the device to perform the method of one or more of Aspects 13 through 20.

Aspect 36: A method comprising: receiving, by a device and from a scanner, first point data associated with a first frame of an occupancy grid; determining, by the device and based on the first point data, an occupancy status of a first cell of the occupancy grid that is associated with the first point data; receiving, by the device and from the scanner, second point data associated with a second frame of the occupancy grid; determining, by the device and based on the second point data, that a second cell of the occupancy grid is occupied and that the second cell is between the first cell and a grid location of the scanner within the occupancy grid; and preventing, by the device, the occupancy status of the first cell from being modified based on the second frame.

Aspect 37: The method of Aspect 36, wherein the first point data is associated with a set of points in the first cell, and wherein the point data comprises at least one of: a set of coordinates corresponding to a location an on object associated with the first cell, a set of velocities associated with the object in each direction of a coordinate system corresponding to the object, a first indication that identifies a probability that the set of points represents an object that is occupying the cell, or a second indication that is indicative of a size of an object that is represented by set of points.

Aspect 38: The method of Aspects 36 and/or 37, wherein the occupancy status for the cell in the first frame is determined based on a probability of existence of an object associated with a set of points of the first point data and a radar cross section measurement associated with the set of points of the first point data.

Aspect 39: The method of Aspects 36 through 38, wherein the second cell is determined to be occupied based on a probability of existence of an object associated with a set of points of the second point data and a radar cross section measurement associated with the set of points of the first point data.

Aspect 40: The method of Aspects 36 through 39, wherein the second cell is determined to be occupied based on an occupancy probability of the second cell being greater than a probability threshold.

Aspect 41: The method of Aspect 40, wherein, based on the occupancy status indicating that the occupancy probability of the second cell is greater than the probability threshold, the second cell is designated as occupied for a remaining duration of a session associated with the scanner.

Aspect 42: The method of Aspects 36 through 41, wherein preventing the occupancy status of the first cell from being modified comprises: fixing, for the second frame, the occupancy status of the first cell as determined according to the first frame.

Aspect 43: The method of Aspects 36 through 42, wherein the second cell is determined to be between the first cell and the grid location of the scanner based on the first cell being aligned with the second cell and the grid location.

Aspect 44: An apparatus for wireless communication at a device, comprising a processor; memory coupled with the processor; and instructions stored in the memory and executable by the processor to cause the apparatus to perform the method of one or more of Aspects 36-43.

Aspect 45: A device for wireless communication, comprising a memory and one or more processors coupled to the memory, the one or more processors configured to perform the method of one or more of Aspects 36-43.

Aspect 46: An apparatus for wireless communication, comprising at least one means for performing the method of one or more of Aspects 36-43.

Aspect 47: A non-transitory computer-readable medium storing code for wireless communication, the code comprising instructions executable by a processor to perform the method of one or more of Aspects 36-43.

Aspect 48: A non-transitory computer-readable medium storing a set of instructions for wireless communication, the set of instructions comprising one or more instructions that, when executed by one or more processors of a device, cause the device to perform the method of one or more of Aspects 36-43.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device and from a scanner associated with a vehicle, first point data associated with a first frame of an occupancy grid;
   determining, by the device and based on the first point data, an occupancy probability of a first cell of the occupancy grid that is associated with the first point data and indicates that the first cell of the occupancy grid is occupied;
   receiving, by the device and from the scanner, second point data associated with a second frame of the occupancy grid;
   determining, by the device and based on the second point data, an occupancy probability of a second cell of the occupancy grid that is associated with the second point data and indicates that the second cell of the occupancy grid is occupied;
   designating, by the device and based on the occupancy probability of the second cell being greater than a permanence threshold, the second cell as occupied for a remaining duration of a session associated with the scanner,
      wherein the second cell is not within a field of view of the scanner during the remaining duration of the session;
   determining, by the device and based on a grid location of the first cell and the second cell within the occupancy grid, that the second cell is between the first cell and a grid location of the scanner within the occupancy grid;
   reducing, by the device, the occupancy probability of other cells of the occupancy grid, the other cells being different from the second cell, while preventing the occupancy probability of the first cell from being reduced for at least a duration of the second frame; and performing, by the device, an action associated with controlling an operation of the vehicle based at least in part on the occupancy grid.

2. The method of claim 1, wherein the first point data is associated with a set of points with grid locations in the first cell, and
wherein the point data comprises at least one of:
a probability of existence score that identifies a probability that the set of points represents an object that is occupying the first cell, or
a radar cross section measurement that is indicative of a size of an object that is represented by set of points.

3. The method of claim 1, wherein the occupancy probability for the first cell in the first frame is determined based on a weighted score associated with a probability of existence of an object associated with a set of points of the first point data and a radar cross section measurement associated with the set of points of the first point data.

4. The method of claim 1, wherein the occupancy probability for the second cell in the second frame is determined based on a weighted score associated with a probability of existence of an object associated with a set of points of the second point data and a radar cross section measurement associated with the set of points of the first point data.

5. The method of claim 1, wherein the occupancy probability of the second cell indicates that the second cell of the occupancy grid is occupied in case an occupancy probability of the second cell is greater than a probability threshold.

6. The method of claim 1, wherein the session corresponds to one or more of:
a time period associated with the vehicle traveling from an initial location to a destination,
a time period associated with the vehicle transitioning from a first drive mode to a second drive mode and back to the first drive mode,
a fixed period of time, or
a period of time determined based on a user input.

7. The method of claim 1, wherein the preventing the occupancy probability of the first cell from being reduced comprises:
fixing, for the duration of the second frame, the occupancy probability of the first cell as determined according to the first frame.

8. The method of claim 1, wherein the determining that the second cell is between the first cell and the grid location of the scanner comprises:
determining that the grid location of the first cell is aligned with the grid location of the second cell and the grid location of the scanner within the occupancy grid.

9. A device, comprising:
one or more memories; and
one or more processors, coupled to the one or more memories, configured to:
receive, from a scanner associated with a vehicle, first point data associated with a first frame of an occupancy grid;
determine, based on the first point data, an occupancy probability of a first cell of the occupancy grid that is associated with the first point data and indicates that the first cell of the occupancy grid is occupied;
receive, from the scanner, second point data associated with a second frame of the occupancy grid;
determine, based on the second point data, an occupancy probability of a second cell of the occupancy grid that is associated with the second point data and indicates that the second cell of the occupancy grid is occupied;

designate, based on the occupancy probability of the second cell being greater than a permanence threshold, the second cell as occupied for a remaining duration of a session associated with the scanner, wherein the second cell is not within a field of view of the scanner during the remaining duration of the session;
determine, based on a grid location of the first cell and the second cell within the occupancy grid, that the second cell is between the first cell and a grid location of the scanner within the occupancy grid;
reduce the occupancy probability of other cells of the occupancy grid, the other cells being different from the second cell, while preventing the occupancy probability of the first cell from being reduced for at least a duration of the second frame; and
perform an action associated with controlling an operation of the vehicle based at least in part on the occupancy grid.

10. The device of claim 9, wherein the first point data is associated with a set of points with grid locations in the first cell, and
wherein the point data comprises at least one of:
a probability of existence score that identifies a probability that the set of points represents an object that is occupying the first cell, or
a radar cross section measurement that is indicative of a size of an object that is represented by set of points.

11. The device of claim 9, wherein the occupancy probability for the first cell in the first frame is determined based on a weighted score associated with a probability of existence of an object associated with a set of points of the first point data and a radar cross section measurement associated with the set of points of the first point data.

12. The device of claim 9, wherein the occupancy probability for the second cell in the second frame is determined based on a weighted score associated with a probability of existence of an object associated with a set of points of the second point data and a radar cross section measurement associated with the set of points of the first point data.

13. The device of claim 9, wherein the occupancy probability of the second cell indicates that the second cell of the occupancy grid is occupied in case an occupancy probability of the second cell is greater than a probability threshold.

14. The device of claim 9, wherein the session corresponds to one or more of:
a time period associated with the vehicle traveling from an initial location to a destination,
a time period associated with the vehicle transitioning from a first drive mode to a second drive mode and back to the first drive mode,
a fixed period of time, or
a period of time determined based on a user input.

15. The device of claim 9, wherein the preventing the occupancy probability of the first cell from being reduced comprises:
fix, for the duration of the second frame, the occupancy probability of the first cell as determined according to the first frame.

16. The device of claim 9, wherein the determining that the second cell is between the first cell and the grid location of the scanner comprises:
determine that the grid location of the first cell is aligned with the grid location of the second cell and the grid location of the scanner within the occupancy grid.

17. A non-transitory computer-readable medium storing a set of instructions, the set of instructions comprising:

one or more instructions that, when executed by one or more processors of a device, cause the device to:
receive, from a scanner associated with a vehicle, first point data associated with a first frame of an occupancy grid;
determine, based on the first point data, an occupancy probability of a first cell of the occupancy grid that is associated with the first point data and indicates that the first cell of the occupancy grid is occupied;
receive, from the scanner, second point data associated with a second frame of the occupancy grid;
determine, based on the second point data, an occupancy probability of a second cell of the occupancy grid that is associated with the second point data and indicates that the second cell of the occupancy grid is occupied;
designate, based on the occupancy probability of the second cell being greater than a permanence threshold, the second cell as occupied for a remaining duration of a session associated with the scanner, wherein the second cell is not within a field of view of the scanner during the remaining duration of the session;
determine, based on a grid location of the first cell and the second cell within the occupancy grid, that the second cell is between the first cell and a grid location of the scanner within the occupancy grid;
reduce the occupancy probability of other cells of the occupancy grid, the other cells being different from the second cell, while preventing the occupancy probability of the first cell from being reduced for at least a duration of the second frame; and
perform an action associated with controlling an operation of the vehicle based at least in part on the occupancy grid.

18. The non-transitory computer-readable medium of claim 17, wherein the first point data is associated with a set of points with grid locations in the first cell, and
wherein the point data comprises at least one of:
a probability of existence score that identifies a probability that the set of points represents an object that is occupying the first cell, or
a radar cross section measurement that is indicative of a size of an object that is represented by set of points.

19. The non-transitory computer-readable medium of claim 17, wherein the occupancy probability for the first cell in the first frame is determined based on a weighted score associated with a probability of existence of an object associated with a set of points of the first point data and a radar cross section measurement associated with the set of points of the first point data.

20. The non-transitory computer-readable medium of claim 17, wherein the occupancy probability for the second cell in the second frame is determined based on a weighted score associated with a probability of existence of an object associated with a set of points of the second point data and a radar cross section measurement associated with the set of points of the first point data.

21. The non-transitory computer-readable medium of claim 17, wherein the occupancy probability of the second cell indicates that the second cell of the occupancy grid is occupied in case an occupancy probability of the second cell is greater than a probability threshold.

22. The non-transitory computer-readable medium of claim 17, wherein the session corresponds to one or more of:
a time period associated with the vehicle traveling from an initial location to a destination,
a time period associated with the vehicle transitioning from a first drive mode to a second drive mode and back to the first drive mode,
a fixed period of time, or
a period of time determined based on a user input.

23. The non-transitory computer-readable medium of claim 17, wherein the one or more instructions further cause the device to:
fix, for the duration of the second frame, the occupancy probability of the first cell as determined according to the first frame.

24. The non-transitory computer-readable medium of claim 17, wherein the one or more instructions further cause the device to:
determine that the grid location of the first cell is aligned with the grid location of the second cell and the grid location of the scanner within the occupancy grid.

25. An apparatus, comprising:
means for receiving, from a scanner associated with a vehicle, first point data associated with a first frame of an occupancy grid;
means for determining, based on the first point data, an occupancy probability of a first cell of the occupancy grid that is associated with the first point data and indicates that the first cell of the occupancy grid is occupied;
means for receiving, from the scanner, second point data associated with a second frame of the occupancy grid;
means for determining, based on the second point data, an occupancy probability of a second cell of the occupancy grid that is associated with the second point data and indicates that the second cell of the occupancy grid is occupied;
means for designating, based on the occupancy probability of the second cell being greater than a permanence threshold, the second cell as occupied for a remaining duration of a session associated with the scanner, wherein the second cell is not within a field of view of the scanner during the remaining duration of the session;
means for determining, based on a grid location of the first cell and the second cell within the occupancy grid, that the second cell is between the first cell and a grid location of the scanner within the occupancy grid;
means for reducing the occupancy probability of other cells of the occupancy grid, the other cells being different from the second cell, while preventing the occupancy probability of the first cell from being reduced for at least a duration of the second frame; and
means for performing an action associated with controlling an operation of the vehicle based at least in part on the occupancy grid.

26. The apparatus of claim 25, wherein the first point data is associated with a set of points with grid locations in the first cell, and
wherein the point data comprises at least one of:
a probability of existence score that identifies a probability that the set of points represents an object that is occupying the first cell, or
a radar cross section measurement that is indicative of a size of an object that is represented by set of points.

27. The apparatus of claim 25, wherein the occupancy probability for the first cell in the first frame is determined based on a weighted score associated with a probability of existence of an object associated with a set of points of the first point data and a radar cross section measurement associated with the set of points of the first point data.

28. The apparatus of claim 25, wherein the occupancy probability for the second cell in the second frame is determined based on a weighted score associated with a probability of existence of an object associated with a set of points of the second point data and a radar cross section measurement associated with the set of points of the first point data.

29. The apparatus of claim 25, wherein the occupancy probability of the second cell indicates that the second cell of the occupancy grid is occupied in case an occupancy probability of the second cell is greater than a probability threshold.

30. The apparatus of claim 25, further comprising:
means for fixing, for the duration of the second frame, the occupancy probability of the first cell as determined according to the first frame.

* * * * *